(12) United States Patent
Koitabashi

(10) Patent No.: US 7,885,495 B2
(45) Date of Patent: Feb. 8, 2011

(54) NON-CONTACT CONNECTOR

(75) Inventor: Hiroyuki Koitabashi, Komaki (JP)

(73) Assignee: Chubu Nihon Maruko Co., Ltd., Aichi (JP)

( * ) Notice: Subject to any disclaimer, the term of this patent is extended or adjusted under 35 U.S.C. 154(b) by 11 days.

(21) Appl. No.: 12/368,756

(22) Filed: Feb. 10, 2009

(65) Prior Publication Data

US 2010/0040378 A1 Feb. 18, 2010

(30) Foreign Application Priority Data

Aug. 13, 2008 (JP) ............................. 2008-208422

(51) Int. Cl.
G02B 6/26 (2006.01)
G02B 6/42 (2006.01)
G02B 5/08 (2006.01)
(52) U.S. Cl. ..................... 385/26; 359/850; 359/857
(58) Field of Classification Search .............. 385/25, 385/26; 359/850, 857, 861
See application file for complete search history.

(56) References Cited

U.S. PATENT DOCUMENTS

| 4,900,117 | A |   | 2/1990 | Chen |       |
|-----------|---|---|--------|------|-------|
| 5,319,726 | A | * | 6/1994 | Abney | 385/26 |
| 5,436,988 | A | * | 7/1995 | Narendran | 385/26 |
| 7,248,761 | B2 | * | 7/2007 | Schilling et al. | 385/25 |
| 7,526,155 | B2 | * | 4/2009 | Hirohashi et al. | 385/26 |
| 2009/0067074 | A1 |   | 3/2009 | Koitabashi |  |

FOREIGN PATENT DOCUMENTS

| EP | 2 058 687 | 5/2009 |
| JP | 02-247604 | 10/1990 |
| JP | A 2002-75760 | 3/2002 |
| JP | A 2006-197553 | 7/2006 |
| JP | 2008-124236 | 5/2008 |

OTHER PUBLICATIONS

Korean Office Action and its English translation issued in corresponding Korean Application No. 10-2009-0013714 on Aug. 20, 2010.
Extended European Search Report and its English translation issued in corresponding European Application No. 09152027.0 on Jul. 13, 2010.
Japanese Office Action and its partial English translation issued in corresponding Japanese Patent Application No. 2008-208422 on Oct. 19, 2010.

* cited by examiner

*Primary Examiner*—Daniel Petkovsek
(74) *Attorney, Agent, or Firm*—Greer, Burns & Crain, Ltd.

(57) ABSTRACT

With the light-emitting side focal point F1 of a three-dimensional elliptical reflecting body A being on the side of a rotating body, the light-receiving side focal point F2 being on the side of a fixed body, the condensing action from the F1 to F2 is used to configure an optical path from a rotating-side light-emitting element A set at F1, via a fixed-side elliptical partial mirror in which a portion of the three-dimensional elliptical body is used as a mirror face, to a fixed-side light-receiving element A set at F2, and to configure a simultaneous bidirectional single-channel optical path from a fixed-side light-emitting element A set at F1 of a three-dimensional elliptical reflecting body B, via a rotating-side elliptical partial mirror, to a rotating-side light-receiving element A set at F2.

8 Claims, 15 Drawing Sheets

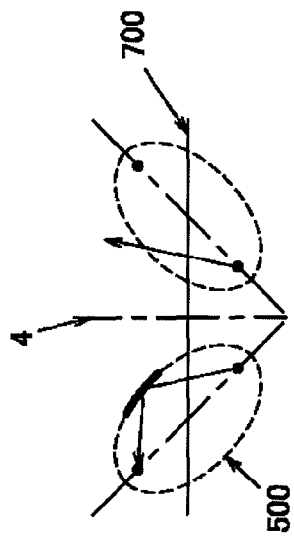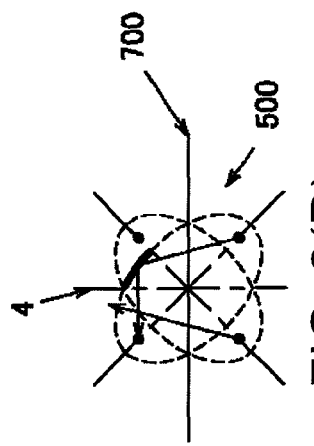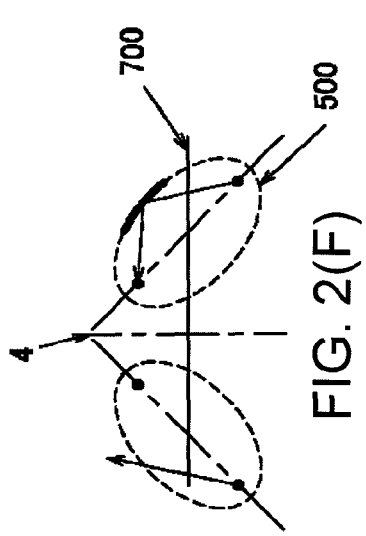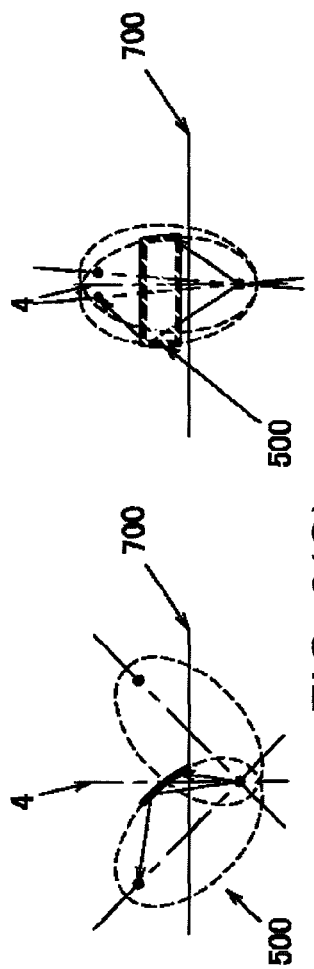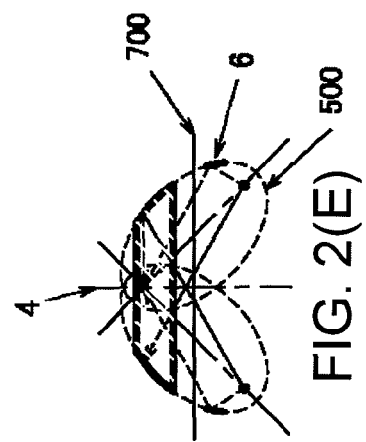
FIG. 2(A) FIG. 2(B) FIG. 2(C) FIG. 2(D) FIG. 2(E) FIG. 2(F)

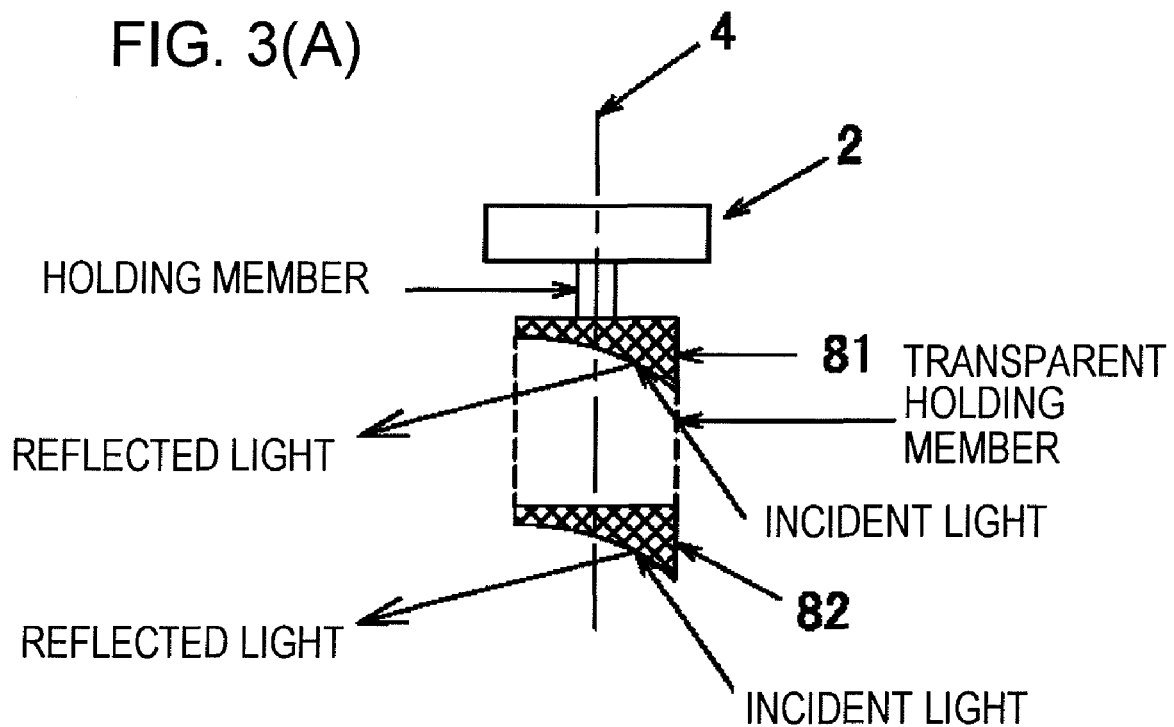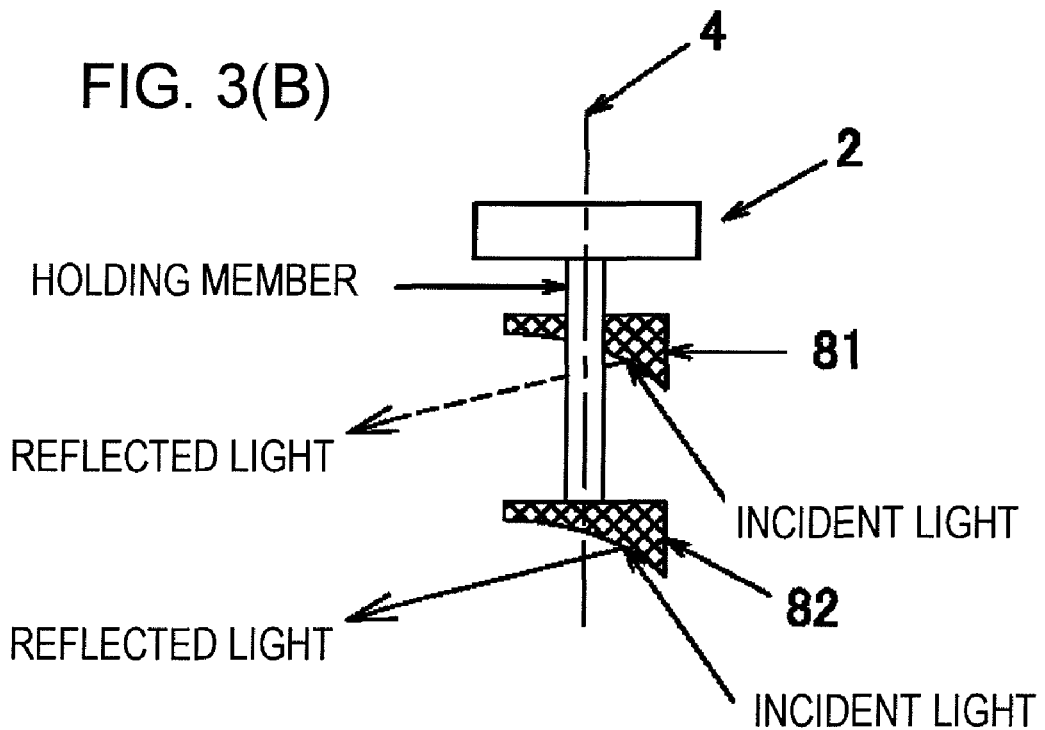

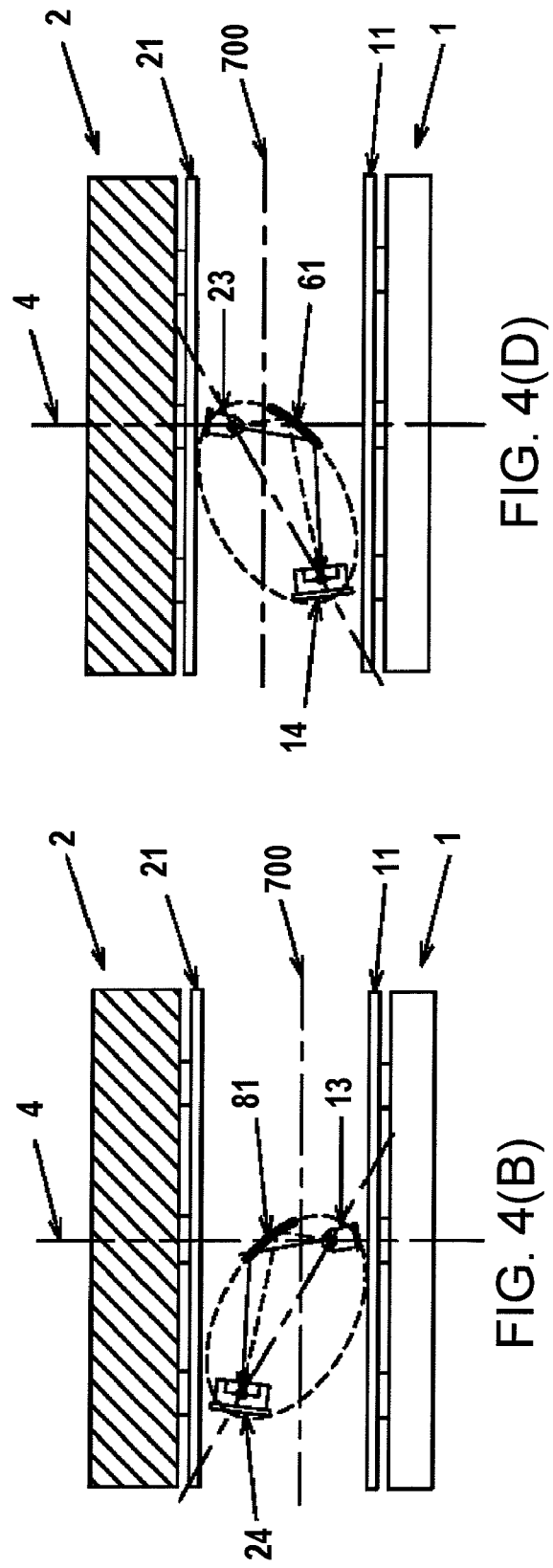

NON-CONTACT CONNECTOR

CROSS-REFERENCE TO RELATED APPLICATIONS

This application is based upon and claims the benefit of priority of the prior Japanese Patent Application No. 2008-208422, filed on Aug. 13, 2008, the entire contents of which are incorporated herein by reference.

FIELD

The present invention relates to a non-contact connector (10).

BACKGROUND

In the prior art, data transmission and reception between a rotating side and a fixed side has been performed. For example, a camera is provided on a rotatable base, and image signals or similar from the camera are transmitted to a fixed-side signal processing portion, and similar. In this case, image signals from the camera have been transmitted to the fixed-side signal processing portion by direct connection of wires between the camera and the signal processing portion. However, due to recent advances in wireless technology, it has become possible to transmit and receive signals (data) between a rotating side and a fixed side, even when there is no direct connection of wires.

However, in order to cause image capture or other operations on the rotating side, power must be supplied to the rotating side; but there has been the problem that the supply of power from a fixed side to a rotating side without contact is difficult.

In the past, when addressing these problems, for signal transmission, a plurality of light-emitting elements are provided on the upper portion of a disc-shape rotating body, and a plurality of light-receiving elements of a fixed body are provided at positions opposing the light-emitting elements, with data transmitted and received without contact, or for power transmission, with a rotating transformer configured between the rotating side and the fixed side, to realize a method of non-contact power supply from the fixed side to the rotating side (see for example Japanese Patent Application Laid-open No. 2002-75760, and Japanese Patent Application Laid-open No. 2006-197553).

However, in Japanese Patent Application Laid-open No. 2002-75760, when the speed of data communication increases, it is not always possible transmit all of the data from the light-emitting element of the rotating body to the light-receiving element of the fixed body. That is, in Japanese Patent Application Laid-open No. 2002-75760, the optical path from the light-emitting element is switched to another light-emitting element so that there is no interruption of the non-contact optical connection between optical elements accompanying rotation of the rotating body. When using this switching method, as the data communication speed increases, there are cases in which data is transmitted faster than the processing time to switch the optical path, and so the problem has occurred that the continuity of high-speed communication cannot be secured.

Also, in Japanese Patent Application Laid-open No. 2006-197553, because light-receiving element switching is no longer necessary, high-speed communication can be accommodated; but a mechanism (gears or similar) to control the rotation speed is needed, and backlash of the mechanism components must be considered. Moreover, light from a light-emitting element is dispersed before being received, so that only a portion of the light emitted reaches to the light-receiving element, and so the problem arises that application to analog signal communication is not possible.

The present invention was devised in light of the above problems, and has as an object the provision of a non-contact connector which enables multi-channel analog communication, without the need to consider backlash or similar, while securing continuity of high-speed communication.

SUMMARY

With the foregoing in view, it is an object of the present invention to provide a non-contact connector (10), having: a rotating body (1); a fixed body (2); a rotating-side light-emitting element A (13) and rotating-side light receiving element A (14) installed on the rotating body respectfully; and a fixed-side light-emitting element A (23) and a fixed-side light-receiving element A (24) installed on the fixed body respectfully, wherein with the light-emitting side focal point F1 (3) of a three-dimensional elliptical reflecting body A (500) being on the side of the rotating body (1) and the light-receiving side focal point F2 (5) being on the side of the fixed body (2), the condensing action from the F1 (3) to F2 (5) is used to configure an optical path from the rotating-side light-emitting element A (13) set at F1 (3), via a fixed-side elliptical partial mirror (8) in which a portion of the three-dimensional elliptical body is used as a mirror face, to the fixed-side light-receiving element A (24) set at F2 (5), and to configure a simultaneous bidirectional single-channel optical path from the fixed-side light-emitting element A (23) set at F1 (3) of a three-dimensional elliptical reflecting body B (501), via a rotating-side elliptical partial mirror (6) in which a portion of the three-dimensional elliptical reflecting body B (501) is used as a mirror face, to the rotating-side light-receiving element A (14) set at F2 (5); and non-contact multi-channel optical communication is performed simultaneously and bidirectionally by configuring a plurality of single-channel optical paths, simultaneously and bidirectionally, between the rotating body (1) and fixed body (2).

By this means, for example, no matter what the position of the rotating-side light-emitting element (13) accompanying rotation of the rotating body (1), light emitted from the rotating-side light-emitting element (13) is always directed toward a specific fixed-side light-receiving element (24) due to the condensing effect of the geometric shape of the elliptical mirror (fixed-side elliptical partial mirror (8)), so that a single optical path without interruption can be realized, and continuous communication can be secured. Next, when a plurality of such optical paths are configured and made bidirectional, multi-channel and bidirectional communication is secured.

The non-contact connector (10), wherein a two-channel communication system is configured, by means of the optical path of a first channel, in which the light-emitting side focal point F1 (3) of a fixed-side ellipse section shape mirror A (81), which is a section shape of the fixed-side elliptical partial mirror (8), is placed on a rotation axis (4), and light emitted from the rotating-side light-emitting element A (13) installed so as to condense light on the focal point F1 (3) is reflected by the fixed-side ellipse section shape mirror A (81) to arrive at the fixed-side light-receiving element A (24) installed at the other focal point F2 (5) of the fixed-side ellipse section shape mirror A (81), and the optical path of a second channel, in which light emitted from the rotating-side light-emitting element B (131) installed so as to condense light on the light-emission side focal point of a rotating-side ellipse section shape mirror B (62), which is a section shape of the rotating-side elliptical partial mirror (6), is reflected by the rotating-side ellipse section shape mirror B (62) installed such that the other light-receiving side focal point coincides with the rotation axis (4) to arrive at a fixed-side light-receiving element B (241) at the light-receiving side focal point; with the optical paths configured such that substantially 100% of the light emission amounts of light-emitting elements is received by the fixed-side light-receiving element A (24) and by the fixed-side light-receiving element B (241) respectively, and, by making the fixed-side ellipse section shape mirror A (81) and the rotating-side ellipse section shape mirror B (62) partial mirrors of the same ellipsoid, whereby differences, in light-receiving characteristics, between the fixed-side light-receiving element A (24) and the fixed-side light-receiving element B (241) are made negligible, and thereby analogue signal communication is enabled.

The non-contact connector (10), wherein for the optical path configuration of one channel in which the light-emission side focal point F1 (3) of a fixed-side elliptical ring mirror A (91) which is a ring shape of the fixed-side elliptical partial mirror (8) is placed on the rotation axis (4), light emitted from the rotating-side light-emitting element A (13) installed so as to condense light on the focal point F1 (3) is reflected by the fixed-side elliptical ring mirror A (91) to arrive at the fixed-side light-receiving element A (24) installed at the light-receiving side focal point F2 (5) of the fixed-side elliptical ring mirror A (91), a communication system of three or more channels, formed by parallel motion and stacking of the optical path configuration along the rotation axis (4) configures optical paths such that substantially 100% of the light emission amounts of light-emitting elements is received, and the fixed-side elliptical partial mirrors (8) for three or more channels are partial mirrors of the same ellipsoid, whereby differences in light-receiving characteristics between light-receiving elements are made negligible, and thereby analogue signal communication is enabled.

The non-contact connector (10), wherein, with the optical path from the rotating-side light-emitting element A (13) via the fixed-side elliptical partial mirror (8) to the fixed-side light-receiving element A (24) being configured with plane symmetry with respect to a prescribed point on the rotation axis (4), as the optical path from the fixed-side light-emitting element A (23) via the rotating-side elliptical partial mirror (6) to the rotating-side light-receiving element A (14), a configuration method of configuring a simultaneous bidirectional single-channel communication system is applied to configuration for a plurality of optical paths, thereby configuring a simultaneous bidirectional multi-channel communication system.

Structures which configure an optical path from the rotating side to the fixed side in this way are configured with planar symmetry with respect to the plane perpendicular to the rotation axis (4) and passing through an arbitrary point on the rotation axis (4), and a multi-channel bidirectional analog communication system is enabled as a light path from the fixed side to the rotating side.

The non-contact connector (10), wherein for the fixed-side elliptical partial mirror (8) and the rotating-side elliptical partial mirror (6), the shapes of the fixed-side ellipse section shape mirror A (81) and the rotating-side ellipse section shape mirror B (62) are not formed as partial section shape mirrors of the same ellipsoid, and the two-channel communication system according to claim 2 is configured, or, for a communication system of three or more channels, the fixed-side elliptical partial mirrors (8) are not formed as partial mirrors of the same ellipsoid, and a multi-channel communication system of three or more channels according to claim 3 is configured; and a multi-channel communication system is configured by means of any combination of the fixed-side ellipse section shape mirror A (81) and the fixed-side ellipse section shape mirror B (82) forming the fixed-side elliptical partial mirrors (8), the fixed-side elliptical ring mirror A (91); the rotating-side ellipse section shape mirror A (61) and the rotating-side ellipse section shape mirror B (62) forming the rotating-side elliptical partial mirror (6), and the rotating-side elliptical ring mirror A (71).

By this means, up to two channels can be configured using an ellipse section shape mirror, three or more channels can be configured using an elliptical ring mirror, a multi-channel system can be configured by relaxing the uniformity between channels, and through arbitrary combination of ellipse section shape mirrors and elliptical ring mirrors, multi-channel systems can be configured.

The non-contact connector (10), wherein a single-channel communication system is configured with the fixed-side elliptical partial mirror (8) as the fixed-side ellipse section shape mirror A (81) or fixed-side ellipse section shape mirror B (82) or the fixed-side elliptical ring mirror A (91), or a simultaneous bidirectional single-channel communication system is configured with the rotating-side elliptical partial mirror (6) as the rotating-side ellipse section shape mirror A (61) or the rotating-side ellipse section shape mirror B (62) or rotating-side elliptical ring mirror A (71).

By this means a bidirectional single-channel system, configured from an ellipse section shape mirror and an elliptical ring mirror, can be configured by combining a single-channel system configured using one among three types of the rotating-side elliptical partial mirror (6) and a single-channel system configured using one among three types of the fixed-side elliptical partial mirror (8), to configure a bidirectional single-channel system.

The non-contact connector (10), further comprising a transformer core and transformer winding in each of the rotating body (1) and fixed body (2), wherein a rotating transformer is formed by the rotating body (1) and the fixed body (2).

By this means, for example, non-contact power supply from the fixed body (2) to the rotating body (1) can be performed.

The non-contact connector (10), wherein the "light-emitting members and light-receiving members" represented by the rotating-side optical elements A (13, 14) and the rotating-side optical elements B (131, 141), and the fixed-side optical elements A (23, 24) and the fixed-side optical elements B (231, 241) are configured using optical fibers with collimators, and that optical paths are formed between the optical fibers.

By this means, for example, high-speed data transmission and reception via multi-channel optical fibers can be performed without contact.

A non-contact connector of the present invention is a line device which utilizes the condensing characteristics of an ellipsoid (light emitted from one focal point of the ellipsoid is condensed at the other focal point), employing a portion of a three-dimensional ellipsoid as a reflecting body to configure an optical path between an optical element installed at the focal point on the rotating side and an optical element installed at the focal point on the fixed side, to realize non-contact wireless communication.

By this means, a wireless line can be configured between a rotating body and a fixed body, and continuous communication is possible. Further, due to the above condensing characteristics of an ellipsoid, substantially 100% of the amount of light transmitted by the light-emitting element can be

BRIEF DESCRIPTION OF DRAWINGS

FIG. 2 is a drawing explaining types and characteristics of elliptical partial mirrors.

DESCRIPTION OF EMBODIMENT(S)

Figure 1:
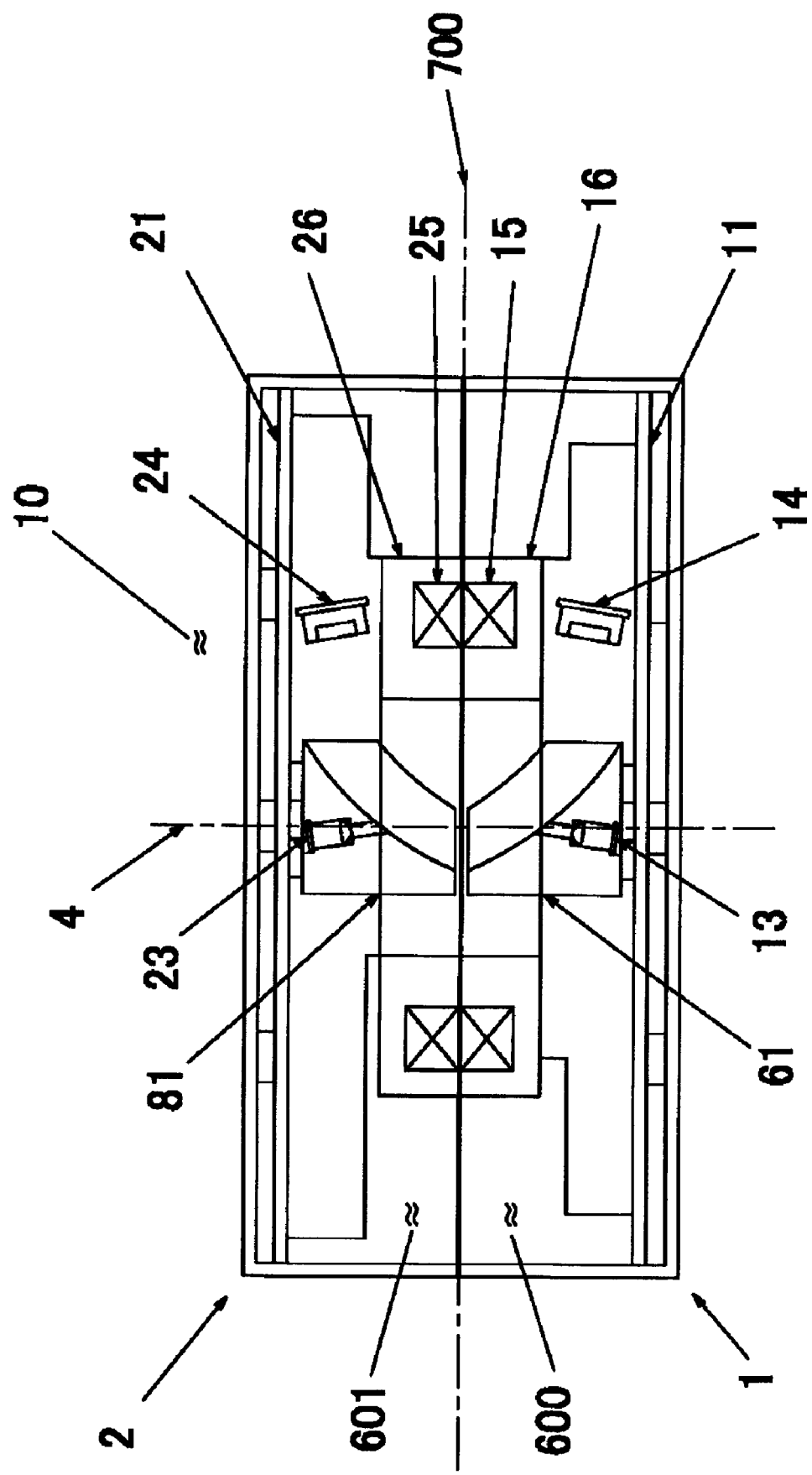
FIG. 1 is a drawing explaining general non-contact connectors to which the present invention is applied.

This embodiment relates to a non-contact operation method in which
  multi-channel communication functions
  analog signal communication functions
  simultaneous bidirectional communication functions
are realized using elliptical partial mirrors, which employ a portion of a three-dimensional ellipsoid as a mirror face.

Below, preferred aspects for applying the present invention are explained, referring to the drawings.

(1) Basic Configuration and Structure of a Non-Contact Connector (10)

FIG. 1 shows a cross-sectional view, including a rotation axis (4), showing one example of the basic configuration and structure of a non-contact connector (10) to which the present invention is applied.

The largest constituent elements are the rotating body (1) and the fixed body (2); the rotating body (1) is configured to enable rotation about the rotation axis (4). The fixed body (2) is arranged as a member which is stationary and opposing the rotating body (1).

The rotating body (1) comprises a rotating-side member (600), rotating-side electrical circuit portion (11), rotating-side transformer windings (15), and rotating-side transformer core (16). Next, the fixed body (2) comprises a fixed-side member (601), fixed-side electrical circuit portion (21), fixed-side transformer windings (25), and fixed-side transformer core (26).

(2) Detailed Configuration and Functions of the Rotating-Side Member (600) and Fixed-Side Member (601)

Next, the detailed configuration and functions of the rotating-side member (600) and fixed-side member (601) are described. The rotating-side member (600) and the fixed-side member (601) are, as their names indicate, an optical path configuration component on the rotating side and an optical path configuration component on the fixed side.

An explanation thereof begins with an explanation of the types, functions, and structures of the rotating-side elliptical partial mirrors (6) and the elliptical partial mirrors (8) installed on the fixed side.

(3) Introduction of Elliptical Partial Mirrors

FIG. 2(A) shows, for an ellipsoid (a three-dimensional ellipsoid having general optical characteristics (light emitted from one focal point of the ellipsoid is reflected by the inner face of the ellipsoid and is condensed at the other focal point)) as a three-dimensional ellipsoidal reflecting body A (500), the relation to an elliptical partial mirror (8) the mirror face of which is obtained by cutting away only a portion of the inner face of the ellipsoid.

First, the ellipses of FIGS. 2(B) to 2(F) represent a three-dimensional elliptical reflecting body A (500), where F1 and F2 represent the light-emitting side focal point F1 and the light-receiving side focal point F2; the state of light emission from the former and light being condensed at the latter, as well as a horizontal solid line representing the boundary center line (700) between the rotating body (1) and the fixed body (2), are shown. Hereafter a state is assumed in which F1 is installed on the side of the rotating body (1), and F2 is installed on the side of the fixed body (2).

The optical path from F1 to F2 when the elliptical arc on the side of the rotating body (1) of the three-dimensional elliptical reflecting body A (500) rotates is considered. (In fact a drawing only of the elliptical arc after rotation is sufficient.) With the position of rotation shown as the position of the rotation axis (4), there are five cases, X to V, as shown in FIGS. 2(B) to 2(F).

Position X of rotation axis (4): Outside the focal point F1—see FIG. 2(B)

Position Y of rotation axis (4): At the focal point F1—see FIG. 2(C)

Position Z of rotation axis (4): Between focal point F1 and focal point F2—see FIG. 2(D)

Position U of rotation axis (4): At the focal point F2—see FIG. 2(E)

Position V of rotation axis (4): Outside the focal point F2—see FIG. 2(F)

First, FIG. 2(B) shows the rotation state for "position X of the rotation axis (4)"; the characteristics of arrangement of the focal points in this rotation state result in movement of both F1 and F2 accompanying rotation.

If the ellipse on the left is a three-dimensional elliptical reflecting body A (500), and the ellipse on the right is in the state after rotation, then because F1 moves and F2 also moves, the elliptical shape cannot be maintained for light emitted from F1, and an optical path cannot be configured. (In fact only the elliptical arc on the side of the rotating body (1) rotates, so that only the elliptical arc after rotation need be drawn; but in order to clarify the rotation of the ellipse, the entire ellipse shape is drawn.)

Next, the rotation state of "position Y of rotation axis (4)" is shown in FIG. 2(C). In this rotation state, the characteristics of arrangement are such that while F2 moves with rotation, F1 is stationary. In this case, as shown in FIG. 2(C), if an elliptical partial mirror (8) is installed, the movement of F2 is absorbed, and an ellipsoid can always be configured.

That is, an optical path from F1 to F2 of the three-dimensional elliptical reflecting body A (500) can be configured even during rotation. In this case the shape of the elliptical partial mirror (8) is of two types, a section shape (shown on the left) and an elliptical ring shape (shown on the right).

FIG. 2(D) shows the rotation state for "position Z of the rotation axis (4)"; in this rotation state, similar to the case of FIG. 2(B), the arrangement characteristics are such that F2 moves with rotation, and F1 also moves. Because F1 moves and F2 also moves, an ellipsoidal shape cannot be maintained for light emitted from F1, and an optical path cannot be configured.

In FIG. 2(E), the rotation state for "position U of the rotation axis (4)" is shown; the characteristics of arrangement in this rotation state are such that F1 moves during rotation, but F2 is stationary. In this case, as shown in FIG. 2(E), there are two installation positions of an elliptical partial mirror (8), on the side of the rotating body (1) and on the side of the fixed body (2). First, considering the side of the fixed body (2), if the cross-section which has the rotation axis (4) as the center axis is a ring-shape mirror, then the movement of F1 is absorbed, and an ellipsoid can always be configured. Next, in the case of installation on the side of the rotating body (1), even if the shape of the elliptical partial mirror (8) is a section shape, an ellipsoid can always be configured. That is, in this case also an optical path from F1 to F2 of the three-dimensional elliptical reflecting body A (500) can be configured.

Finally, the rotation state for the case of "position V of the rotation axis (4)" is shown in FIG. 2(F); similarly to FIG. 2(B), the arrangement characteristics for this rotation state are such that F1 moves with rotation, and F2 also moves.

In this case also, similarly to FIG. 2(B), an ellipse shape cannot be maintained for light emitted from F1, and an optical path cannot be configured.

(4) There are Only Three Types of Elliptical Partial Mirrors

The above can be summarized as follows.

There are two shapes for elliptical partial mirrors (8), section shapes and elliptical ring shapes There are three types of optical paths configured from a rotating body (1) to a fixed body (2) by means of elliptical partial mirrors (8), which are the following A, B, C, D

| Component optical path name | Emitted light source position | Shape and position of elliptical partial mirror (8) | Light-receiving element position | Reference figure |
|---|---|---|---|---|
| A | On rotation axis (4) | Section shape; on side of fixed body (2) on rotation axis (4) | Outside rotation axis (4) | Left-hand drawing in FIG. 2(C) |
| B | Outside rotation axis (4) | Section shape; on side of rotating body (1) outside rotation axis (4) | On rotation axis (4) | FIG. 2(E) |
| C | Outside rotation axis (4) | Elliptical ring shape; on side of fixed body (2) on rotation axis (4) | Outside rotation axis (4) | Right-hand drawing in FIG. 2(C) |
| D | Outside rotation axis (4) | Circular ring shape; on side of fixed body (2) on rotation axis (4) | On rotation axis (4) | FIG. 2(E) |

Two supplementary points must be made regarding the notation used in the above table.

The first point is regarding the "emitted light source"; in the table, "emitted light source" refers to a light-emitting element, the light emission point of an optical fiber, or a condensed point of light emitted from a light-emitting element or from an optical fiber.

The second point concerns the difference between "outside the rotation axis (4)" and "on the rotation axis (4)". The former, "outside the rotation axis (4)", means "can be installed at a position other than on the rotation axis (4)". On the other hand, the latter, "on the rotation axis (4)", means "can be installed only at a position on the rotation axis (4)". In other words, there is greater freedom in choosing the installation position in the former case than in the latter case, and "outside the rotation axis (4)" includes "on the rotation axis (4)". Thus a position "on the rotation axis (4)" is a special case of "outside the rotation axis (4)".

Finally, it is seen that among elliptical partial mirrors (8), it can be said that an elliptical ring shape mirror affords greater freedom of optical path configuration than a circular ring shape mirror with respect to the positions of installation of the light emission source and light-receiving element. However, because manufacturing is attended with difficulty, whether an elliptical ring-shape mirror or a section shape mirror should be used must be considered comprehensively in the design phase.

(5) Three Methods of Multi-Channel Design Exist, but Ultimately there are Two Methods Next, multi-channel design using the above elliptical partial mirrors (8) is considered. Multi-channel design entails constructing a plurality of optical paths between a rotating body (1) and a fixed body (2), and so multi-channel design using elliptical partial mirrors (8) entails constructing a plurality of optical paths using the component optical path A, component optical path B, component optical path C, or component optical path D shown in the above table. Methods of configuration are then as follows.

Cases of use of ellipse section shape mirrors

1: Construct a plurality of component optical paths A by stacking section shape mirrors on the rotation axis (4)

2: Construct a plurality of component optical paths B by stacking light-receiving elements on the rotation axis (4)

3: Construct a plurality of (only two) optical paths by combining component optical path A and component optical path B Case of use of elliptical ring shape mirrors

1: Construct a plurality of component optical paths C by stacking elliptical ring shape mirrors on the optical axis (4)

Case of use of circular ring shape mirrors

1: Construct a plurality of component optical paths D by stacking circular ring shape mirrors on the optical axis (4)

Clearly, there are also configuration methods which combine ellipse section shape mirrors, elliptical ring shape mirrors, or circular ring shape mirrors; however, first configuration methods using a sole ellipse section shape mirror, a sole elliptical ring shape mirror, or a sole circular ring shape mirror are described.

(6) In the Case of Use of an Ellipse Section Shape Mirror, the Maximum is Two Channels When applying ellipse section shape mirrors in a multi-channel design, in actuality #1 and #2 are not realizable, while #3 is possible.

Figure 3C:
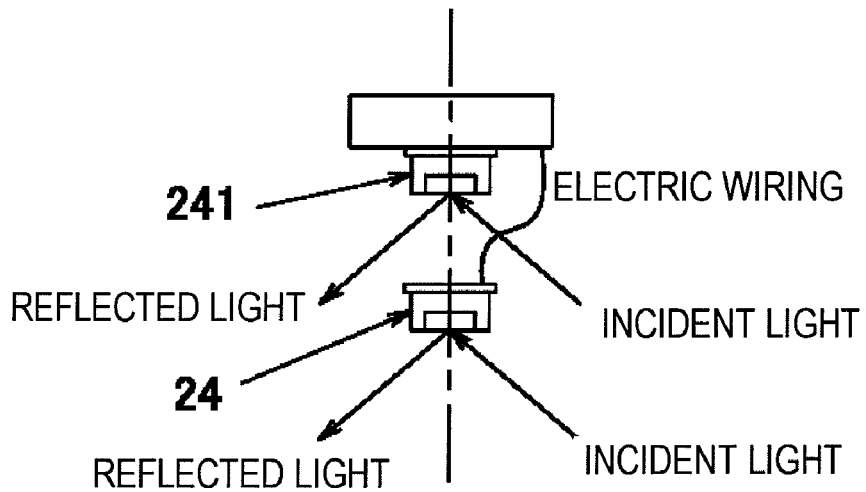
FIG. 3 is a drawing explaining phenomena of obstruction of component optical paths.

FIGS. 3(A) to 3(D) illustrate why #1 and #2 are not possible; the phenomenon of optical path obstruction is the same. FIGS. 3(A) and 3(B) show two examples of structures in which two stacked section shape mirrors are installed. FIG. 3(A) shows a state in which a lower-side section shape mirror is installed using a transparent holding member on an upper-side section shape mirror. The holding method using this transparent member is not impossible if the transmission characteristics and other optical characteristics and structural strength are designed properly, but because an optical path configuration is proposed which assumes a holding member with no optical path obstruction, holding methods using such transparent members are not considered here. FIG. 3(B)

shows a state in which the lower-side section shape mirror is installed on the fixed body (2) (or on the rotating body (1)) through a center hole in the upper-side section shape mirror. In this case, the optical path of light reflected by the upper-side section shape mirror is blocked by the penetrating holding member (dashed line), so that a position occurs in which the optical path is interrupted.

Next, FIG. 3(C) shows a structure in which two light-receiving elements are stacked and installed. In this case, the lower-side light-receiving element must always be installed on the upper-side light-receiving element by means of a transparent holding member, so that input/output wiring to the lower-side light-receiving element is essential, and an optical path configuration which assumes a holding member causing no optical path blockage is not possible.

Figure 3D:
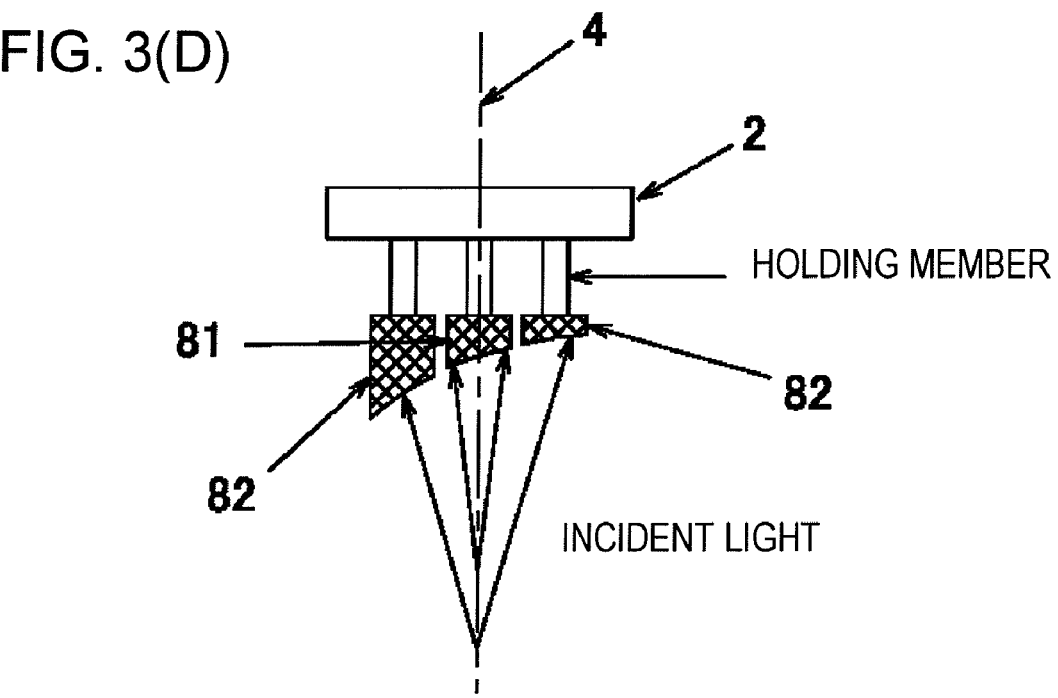

FIG. 3(D) shows an example of arrangement of two ellipse section mirrors in a row to secure two channels. This differs from the cases of stacked installation of section mirrors in FIGS. 3(A) and 3(B) in that there clearly is no blockage phenomenon due to a holding member, so that the method is valid for configuring two channels. However, the reflection angle characteristics differ for the center mirror and the peripheral mirrors, and it is not possible to secure equivalence of the two component optical paths A, and so here this method is not adopted. (Equivalence is discussed below.)

From the above it is concluded that when using ellipse section shape mirrors to form multi-channels, the maximum number is two channels. (A plurality of channels is not possible for either #1 or for #2, and so only combination of the two is possible.)

(7) In the Case of Elliptical Ring Shape Mirrors, Three Channels or More are Possible Next, in cases in which multi-channels are formed using elliptical ring shape mirrors, configuration method #1 (a plurality of the component optical path C formed by stacking ring shape mirrors on the rotation axis (4)) may be used.

(8) When Using Circular Ring Shape Mirrors, Multi-Channel Design is not Possible Next, when attempting multi-channel design using circular ring shape mirrors, light-receiving elements are stacked on the rotation axis (4), and so such design is not possible, for the reason explained in FIG. 3(C) (stacked insulation of light-receiving elements is not possible). Only a single channel can be configured using a circular ring shape mirror.

(9) Configuration and Functions of an Elliptical Optical System for Component Optical Path A The present invention proposes a multi-channel non-contact connector (10) which employs elliptical partial mirrors; as a procedure leading to this connector, first the configuration and functions of an optical system forming a component optical path A is explained.

The optical path configuration of the component optical path A is shown in FIGS. 4(A) to 4(E).

First, FIG. 4(A) shows a unidirectional communication system from a rotating side to a fixed side.

With the inner face of the three-dimensional elliptical reflecting body A (500) as a mirror face, a rotating-side light-emitting element A (13) and fixed-side light-receiving element A (24) are housed therewithin, and a portion of the closed surface of the three-dimensional elliptical reflecting body A (500) is taken to be a fixed-side ellipse section mirror A (81).

Of course this function is a function of optical path configuration from the rotating side to the fixed side; in the drawing, an example state is shown in which, as a light emission source, a rotating-side light-emitting element A (13) is installed, for simplicity in the drawing, directly on one of the light emission-side focal points F1 (3) of the three-dimensional elliptical reflecting body A (500).

Next, FIG. 4(B) shows the overall structure, clarifying the installation positions of the rotating-side light-emitting element A (13), the fixed-side light-receiving element A (24) and the fixed-side ellipse section mirror A (81).

In this structure, the rotating-side light-emitting element A (13) is installed on the rotating body (1), and the fixed-side light-receiving element A (24) and the fixed-side ellipse section mirror A (81) are installed on the fixed body (2).

Next, FIG. 4(C) shows a unidirectional communication system from the rotating side to the fixed side. With the inner face of the three-dimensional elliptical reflecting body B (501) as a mirror face, a fixed-side light-emitting element A (23) and rotating-side light-receiving element A (14) are housed therewithin, and a portion of the closed surface of the three-dimensional elliptical reflecting body B (501) is taken to be a rotating-side ellipse section mirror A (61).

Of course this function is a function of optical path configuration from the fixed side to the rotating side; in the drawing, an example state is shown in which, as a light emission source, a fixed-side light-emitting element A (23) is installed, for simplicity in the drawing, directly on one of the light emission-side focal points of the three-dimensional elliptical reflecting body B (501).

Next, FIG. 4(D) shows the overall structure, clarifying the installation positions of the fixed-side light-emitting element A (23), rotating-side light-receiving element A (14) and the rotating-side ellipse section mirror A (61).

In this structure, the fixed-side light-emitting element A (23) is installed on the fixed body (2), and the rotating-side light-receiving element A (14) and the rotating-side ellipse section mirror A (61) are installed on the rotating body (1).

Figure 4E:
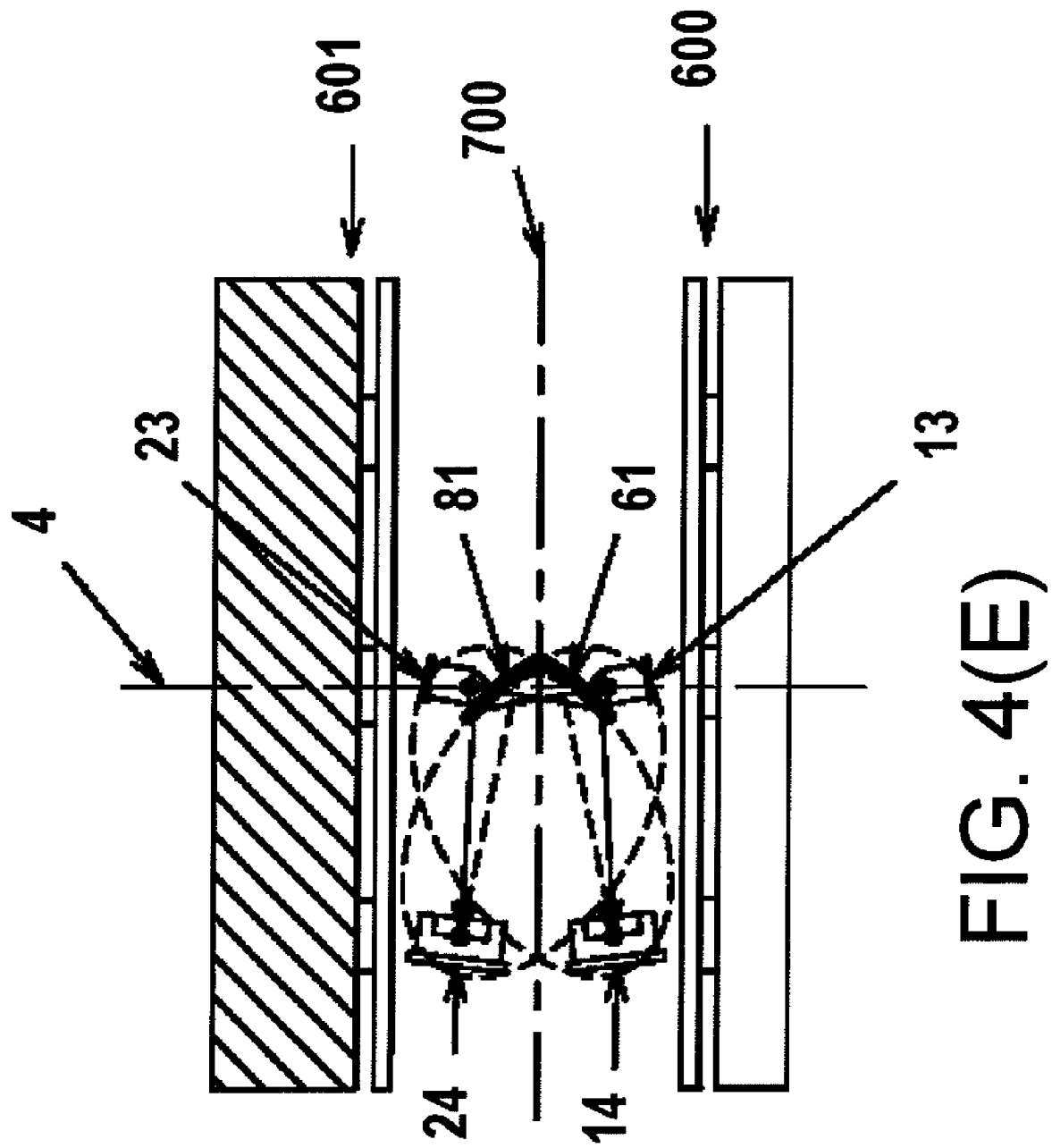
FIG. 4 is a drawing explaining a 1-channel bidirectional communication system and component optical path A.

Finally, FIG. 4(E) shows the configuration, functions, and structure of a rotating-side member (600) and fixed-side member (601) forming the optical system of a non-contact connector (10).

First, the rotating-side member (600) comprises a rotating-side light-emitting element A (13), rotating-side ellipse section mirror A (61), and rotating-side light-receiving element A (14), installed on the rotating body (1). As explained above, the rotating-side light-emitting element A (13) is a member which literally has a function of emitting light from the rotating side; the rotating-side ellipse section mirror A (61) and the rotating-side light-receiving element A (14) are "installed on the rotating side" and have "functions for receiving signals from the fixed side".

The fixed-side member (601) comprises a fixed-side light-emitting element A (23), fixed-side ellipse section mirror A (8), and fixed-side light-receiving element A (24) installed on the fixed body (2). However, the configuration and functions in this case are similar to those of the above rotating-side member (600), and so an explanation is omitted.

Next, as is clear from FIG. 4(E), the structure is such that the rotating-side member (600) is installed in the axis end position of the rotation axis (4) of the rotating body (1), and the fixed-side member (601) is also installed in an opposed state in the axis end position of the rotation axis (4) of the fixed body (2).

(10) Definitions of Dl System and UL System Using FIG. 4(E), communication system definitions are made clear.

Communication system from the rotating side to the fixed side: Refers to the communication system from the rotating-side member (600) to the fixed-side member (601), hereafter called the downlink system and abbreviated as the DL system Communication system from the fixed side to the rotating side: Refers to the communication system from the fixed member (601) to the rotating member (600), hereafter called the uplink system and abbreviated as the UL system

(11) Component Optical Path B and Component Optical Path C

In the above, details of the component optical path A were explained, and so the details of the remaining component optical path B and component optical path C are explained; however, the configuration method is the same as in the case of component optical path A. As explained above, the component optical path D using circular ring mirrors cannot be configured as a multi-channel system using a single circular ring shape mirror, and so is hereafter excluded.

Installation positions of component members may be recapitulated as follows.

Figure 5:
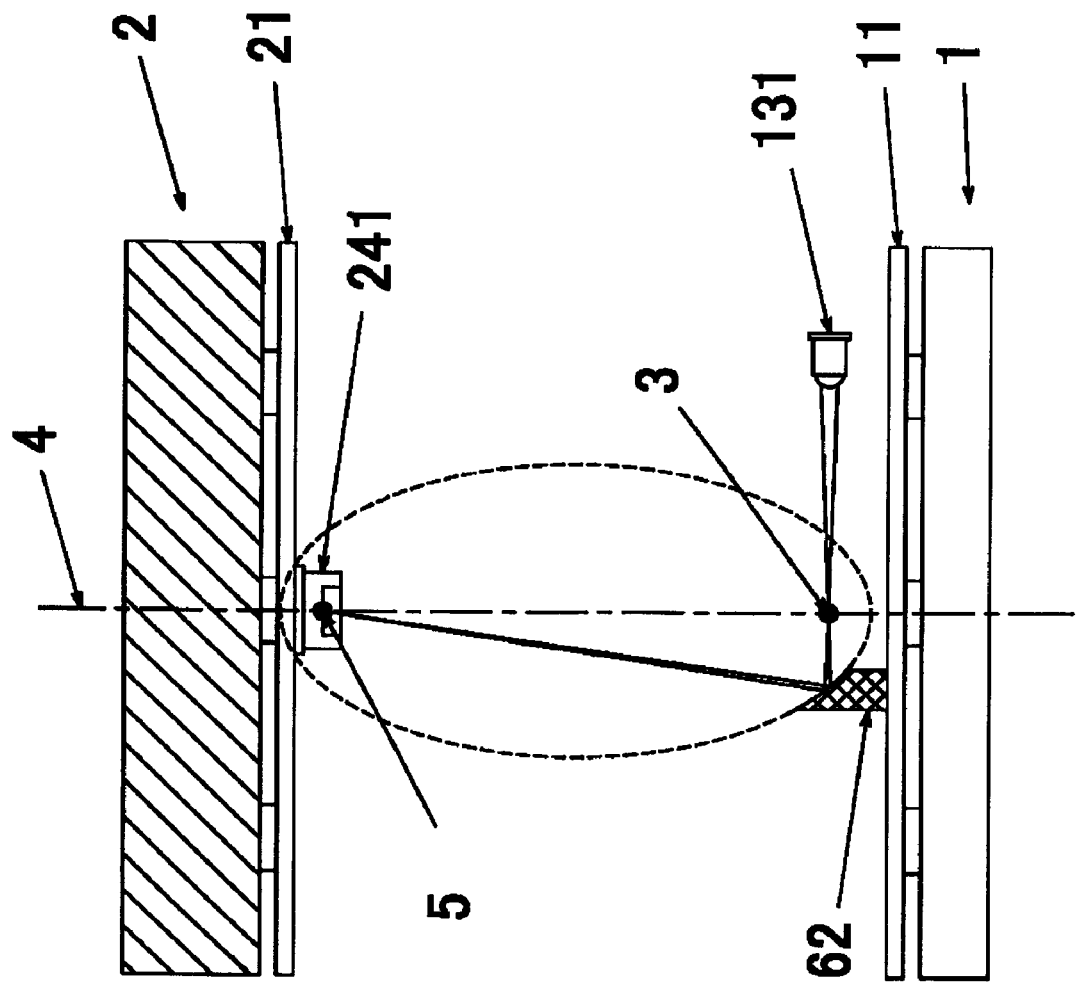
FIG. 5 is a drawing explaining a 1-channel DL communication system and component optical path B.

Component optical path A: Light source on rotation axis, section mirror on rotation axis, light-receiving element outside rotation axis Component optical path B: Light source outside rotation axis, section mirror outside rotation axis, light-receiving element on rotation axis Component optical path C: Light source outside rotation axis, ring shape mirror on optical axis, light-receiving element outside rotation axis FIG. 5 shows the component optical path B, as an example of a configuration in which the light emission source is set on the rotation axis (4), together with an example in which "outside the rotation axis (4) includes the case of on the rotation axis (4)" as a supplementary point of the above table. In FIG. 5, a DL system is shown, comprising the rotating-side light-emitting element B (131) and rotating-side ellipse section mirror B (62) installed on the rotating body (1), and the fixed-side light-receiving element B (241).

Figure 6:
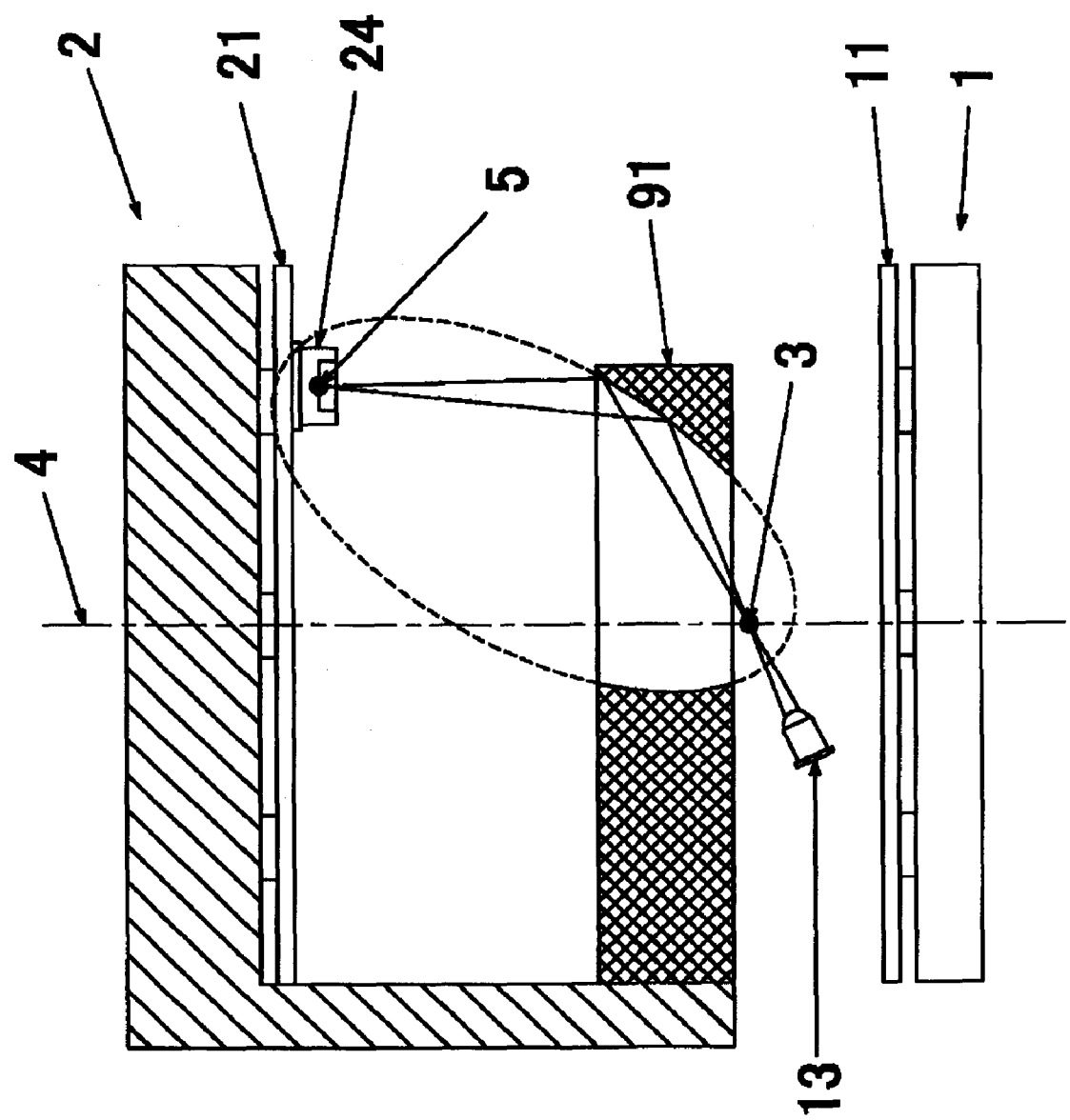
FIG. 6 is a drawing explaining a 1-channel DL communication system and component optical path C.

Next, FIG. 6 shows a component optical path C.

A DL system is shown in FIG. 6 also, comprising a rotating-side light-emitting element A (13) installed on the rotating body (1), and a fixed-side elliptical ring shape mirror A (91) and fixed-side light-receiving element A (24).

(12) Explanation of Meanings of Names

Here, the meanings of names of the component elements are clarified. These are the meanings of "rotating-side" and "fixed-side" contained in the rotating-side light-emitting element, fixed-side light-receiving element, and other names.

A major point of the present invention is that an optical path is configured such that light emission signals from the rotating-side light-emitting element A (13) are received by the fixed-side light-receiving element A (24), and moreover an optical path is configured such that light emission signals from the fixed-side light-emitting element A (23) are received by the rotating-side light-receiving element A (14). Hence the "rotating-side" of the rotating-side light-emitting element means "installed on the rotating side", and moreover the "fixed-side" of the fixed-side light-receiving element A (24) means "installed on the fixed side".

That is, names are assigned assuming that configuration is not performed such that light emission signals from the rotating-side light-emitting element A (13) are received by the rotating-side light-receiving element A (14), or that light emission signals from the fixed-side light-emitting element A (23) are received by the fixed-side light-receiving element A (24).

(13) Method of Construction of the Uplink System (Fixed Side→Rotating Side)

In the explanation of FIG. 4(E), a structure was explained in which the rotating-side member (600) and the fixed-side member (601) are installed in a state of opposition; but in actuality, the figure is drawn as a symmetrical structure of the rotating-side member (600) and fixed-side member (601) with respect to the boundary center line (700).

This is because an optical path configuration method is proposed in which rotating motion of the UL system and DL system is regarded as a relationship of relative motion.

The DL system is a communication system in a state in which the rotating side rotates and the fixed side is stationary, and is a communication system in which communication is only from the fixed side.

This DL system, seen from the perspective of the relative motion in "a state in which the fixed side rotates and the rotating side is stationary", is a communication system in which communication is only from the rotating side.

That is, the UL system and the DL system may have the same structure.

For example, FIG. 4(B) shows a state in which the rotating-side light-emitting element A (13) rotates, and the fixed-side ellipse section mirror A (81) and fixed-side light-receiving element A (24) are stationary; however, this can also be seen as a state in which the rotating-side light-emitting element A (13) is stationary, and the fixed-side ellipse section mirror A (81) and fixed-side light-receiving element A (24) are rotating.

Hence it is shown that if a DL system can be constructed, then a UL system can be constructed merely by changing the rotation side and the fixed side, and if a UL system can be constructed, then a DL system can easily be constructed. Further, as a result of the logic of this configuration method, application to multi-channel systems is also possible (of course, if an UL system can first be constructed, then based on this a DL system can be constructed.)

(14) Method of Construction of Bidirectional Systems

Hence a bidirectional system can be configured by arranging a DL system and a UL system symmetrically with respect to a plane perpendicular to the rotation axis, combined such that the respective ellipse section mirrors (61, 81) do not overlap, and so is extremely simple.

That is, in FIG. 4(E), the rotating-side member (600) and fixed-side member (601) are drawn symmetrically about the boundary line (700) perpendicular to the rotation axis, to configure a bidirectional system.

(15) Conditions for Realization of Analog Communication

A non-contact connector (10) enabling analog communication (communication of analog signals) is discussed. Of course, analog communication is a method of transmitting the analog signals which are to be communicated proportionally (analogously) to the light emission intensity of the light-emitting element of the non-contact connector (10). (In digital communication, there is little strictness with respect to analogous intensity at the light-receiving element.)

Hence to realize analog communication, it is necessary that substantially 100% of the light emission amount of a light-emitting element, which emits light in proportion to the magnitude of a signal for communication, be received during rotational motion.

Clearly, if the reflecting mirror face of an elliptical partial mirror (8) can be designed appropriately with respect to the incident diameter of the light beam, then through the condensing action of the ellipse, substantially 100% reception of light can be achieved, so that analog communication is possible by means of the elliptical partial mirror (8).

And, a premise for achieving 100% light reception is securing of an appropriate light-receiving element; but in order to appropriately use the light-receiving element, an optical path must be configured which reduces fluctuations in the received light intensity due to rotation. This is also necessary to improve the quality of analog communication, and so an optical path must be designed which reduces fluctuations in the angle of incidence on the light-receiving element.

(16) Explanation of Rotating-Side Electrical Circuit Portion (11) and Fixed-Side Electrical Circuit Portion (21)

Next, the rotating-side electrical circuit portion (11) is provided on the rotating body (1), and performs data processing of signals input from various equipment mounted on the rotating side. For example, when the various equipment is a camera for image capture, image signals from the camera and similar are input to the rotating-side electrical circuit portion (11), and electrical signals to cause light emission by the rotating-side light-emitting element A (13) are output.

Further, for the purpose of communication from the fixed body (2) toward the rotating body (1), the rotating-side light-receiving element A (14) receives data from the fixed-side light-emitting element A (23), and outputs the data to the rotating-side electrical circuit portion (11).

Next, the fixed-side electrical circuit portion (21) is provided on the fixed body (2), and outputs data input from the mechanical device on which this non-contact connector (10) is mounted to the fixed-side light-emitting element A (23).

Also, for the purpose of communication from the rotating body (1) to the fixed body (2), data received by the fixed-side light-receiving element A (24) is input to the fixed-side electrical circuit portion (21), processed and output, and is output to the mechanical device on which this non-contact connector (10), to which the fixed body (2) is connected, is mounted.

(17) Explanation of Rotating Transformer

Next, the rotating-side transformer windings (15) are installed in a position of the rotating body (1) opposing the fixed body (2), and power is supplied from the fixed body (2) by means of electromagnetic induction action, so that power can be supplied to the various portions of the rotating body (1) by means of these rotating-side transformer windings (15).

The rotating-side transformer core (16) is formed with a U-shape cross-section, so as to enclose the rotating-side transformer windings (15). The rotating-side transformer core (16) accommodates the rotating-side transformer windings (15) within the depression portion, and forms a rotating transformer together with the fixed-side transformer windings (25) and fixed-side transformer core (26) on the side of the fixed body (2).

The fixed-side transformer windings (25) are positioned on the fixed body (2), in a position opposing the rotating-side transformer windings (15). The fixed-side transformer windings (25) are supplied with power from the device on which this non-contact connector (10), to which the fixed body (2) is connected, is mounted.

The fixed-side transformer core (26) is formed with a U-shape cross-section, so as to enclose the fixed-side transformer windings (25). The fixed-side transformer core (26) accommodates the fixed-side transformer windings (25) within the depression portion, and forms a rotating transformer together with the rotating-side transformer windings (15) and rotating-side transformer core (16) on the side of the rotating body (1).

(18) Addition of One-Channel System

In the above, an optical path configuration method for a bidirectional one-channel (hereafter abbreviated "Ch") system having analog communication functions has been described.

It was stated that the essence is the configuration of a DL system using an ellipse section mirror, and that the UL system need only be a symmetrical arrangement of the DL system.

In the above, a bidirectional 1-Ch system was configured by symmetrical arrangement taking the component optical path A, component optical path B, or component optical path C as the DL system (or UL system); but because this is only construction of a bidirectional 1-Ch system, a bidirectional system can easily be constructed by a configuration method which is not symmetrical arrangement, as for example when the DL system is a component optical path A and the UL system is a component optical path B. This choice should be made according to the actual design requirements.

(19) Addition of the Condition of Securing Uniformity Between Chs in Multi-Ch Analog Communication It goes without saying that a 1-Ch system means a communication system from one light-emitting element to one light-receiving element. Hence a Multi-Ch system refers to a communication system from a plurality of light-emitting elements to a plurality of light-receiving elements. In the following, the optical path configuration of a bidirectional Multi-Ch system having analog communication functions is discussed.

First, in order to obtain a Multi-Ch non-contact connector (10) having analog communication functions, Securing of uniformity between Chs is important to improve convenience.

This is because if there are differences in the characteristics of Chs, the quality of line signals cannot be secured. To this end, it first is necessary to configure a Multi-Ch DL system realizing component optical paths such that the differences in light-reception characteristics between Chs are small.

(20) Summary of the Non-Contact Connector for Analog Communication Required

To summarize the above, in order to configure a Multi-Ch DL system having analog communication functions, it is seen that:

in cases in which ellipse section mirrors are employed,

3, combination of component optical path A and component optical path B (two only), and in cases in which elliptical ring shape mirrors are employed,

1, a plurality of component optical paths C obtained by stacking ring shape mirrors on the rotation axis (4), are used.

This means that a Multi-Ch non-contact connector (10) having analog communication functions can be configured for up to 2 Ch using ellipse section mirrors, and can be configured for 3 or more Chs using elliptical ring-shape mirrors.

Figure 7:
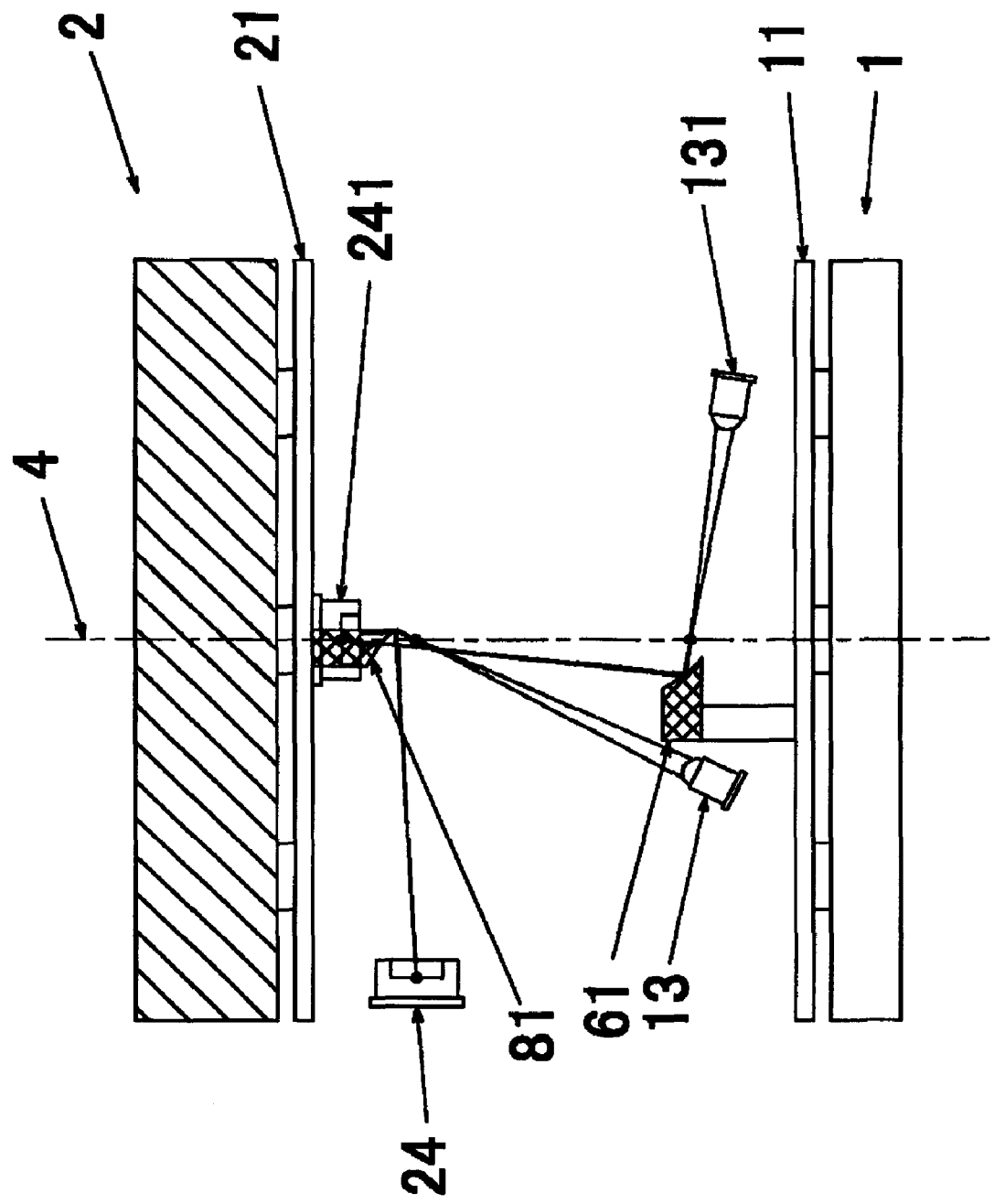
FIG. 7 shows the configuration of a bidirectional 2-Ch system using the same ellipse section mirrors.
Figure 8:
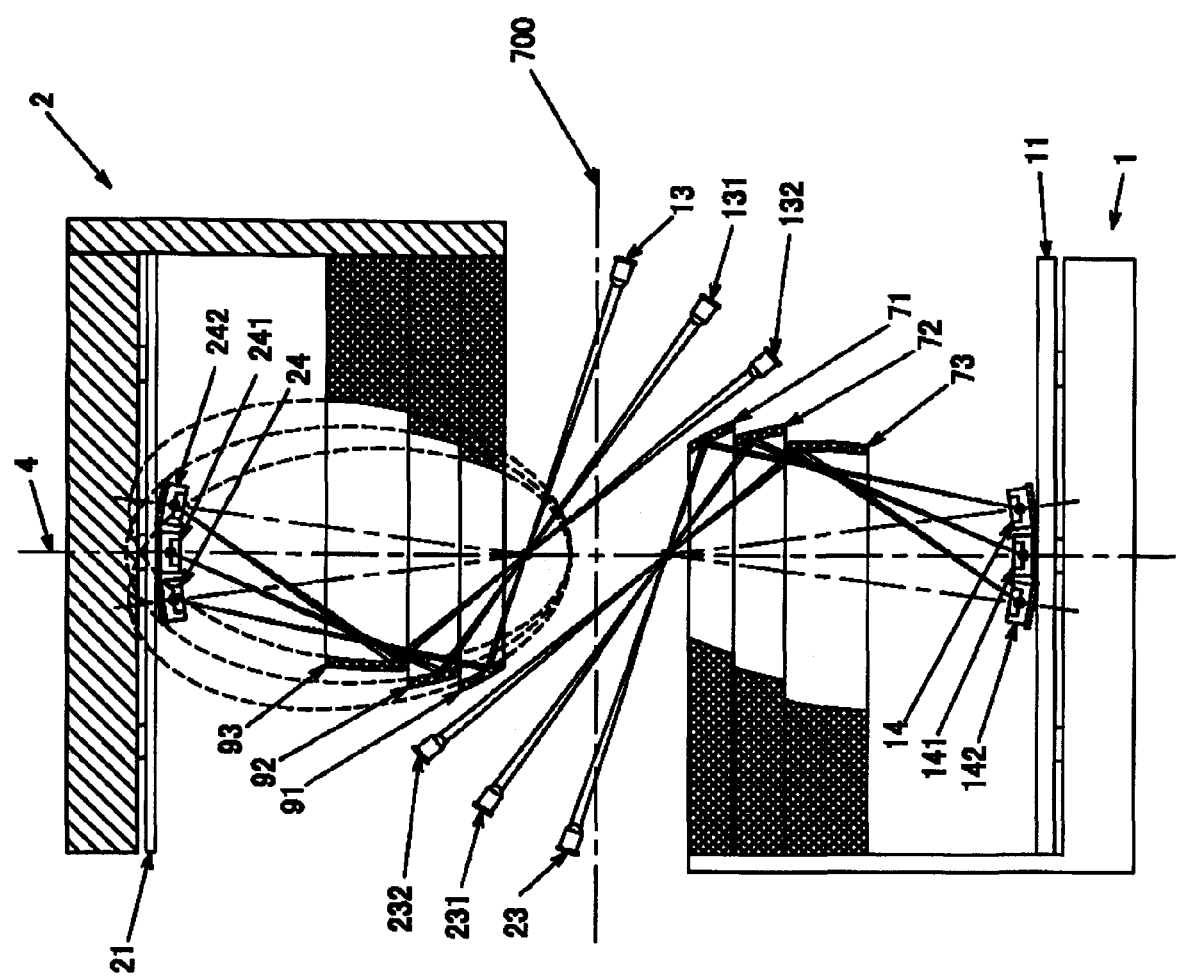
FIG. 8 shows the configuration of a bidirectional 3-Ch system using the same elliptical ring shape mirrors.

FIG. 7 shows a configuration example for the case of ellipse section mirrors, and FIG. 8 shows a configuration example for the case of elliptical ring shape mirrors.

In both cases, in order to configure optical paths such that the differences between light-receiving characteristics among Chs are small, the types of the ellipse section mirrors are made the same, and moreover ellipse section mirrors sectioned from the same ellipsoid are employed.

FIG. 7 shows a 2-Ch DL system.

The types of the ellipse section mirror for each of the Chs forming the 2-Ch DL system are the same ellipse section mirrors, having the same shapes cut from the same ellipsoid.

Next, FIG. 8 shows the case of 3 Chs using elliptical ring shape mirrors, and shows a bidirectional system. The types of the ellipse section mirrors for each of the Chs forming the 3-Ch DL system are the same elliptical ring shape mirrors, having the same shapes cut from the same ellipsoid.

First, the DL system has a structure in which a rotating-side light-emitting element A (13), rotating-side light-emitting element B (131) and rotating-side light-emitting element C (132) are installed on the rotating body (1), and a fixed-side light-receiving element A (24), fixed-side light-receiving element B (241), and fixed-side light-receiving element C (242), as well as three mirrors which are a fixed-side elliptical ring shape mirror A (91), a fixed-side elliptical ring shape mirror B (92), and a fixed-side elliptical ring shape mirror C (93), are installed on the fixed body (2).

Next, the UL system has a structure in which a fixed-side light-emitting element A (23), fixed-side light-emitting element B (231), and fixed-side light-emitting element C (232) are installed on the fixed body (2), and a rotating-side light-receiving element A (14), rotating-side light-receiving element B (141), and rotating-side light-receiving element C (142), as well as three mirrors which are a rotating-side elliptical ring shape mirror A (71), a rotating-side elliptical ring shape mirror B (72), and a rotating-side elliptical ring shape mirror C (73), are installed on the rotating body (1).

In the above, methods of configuration of a Multi-Ch non-contact connector (10), having analog communication functions, using isolated ellipse section mirrors and isolated elliptical ring shape mirrors, have been described.

However, as explained above, there are also configuration methods which combine ellipse section mirrors, elliptical ring mirrors, or circular ring mirrors.

In this configuration method, the shapes and types of elliptical partial mirrors applied for each Ch differ, and so the condition of "uniformity among Chs" is relaxed.

Figure 9:
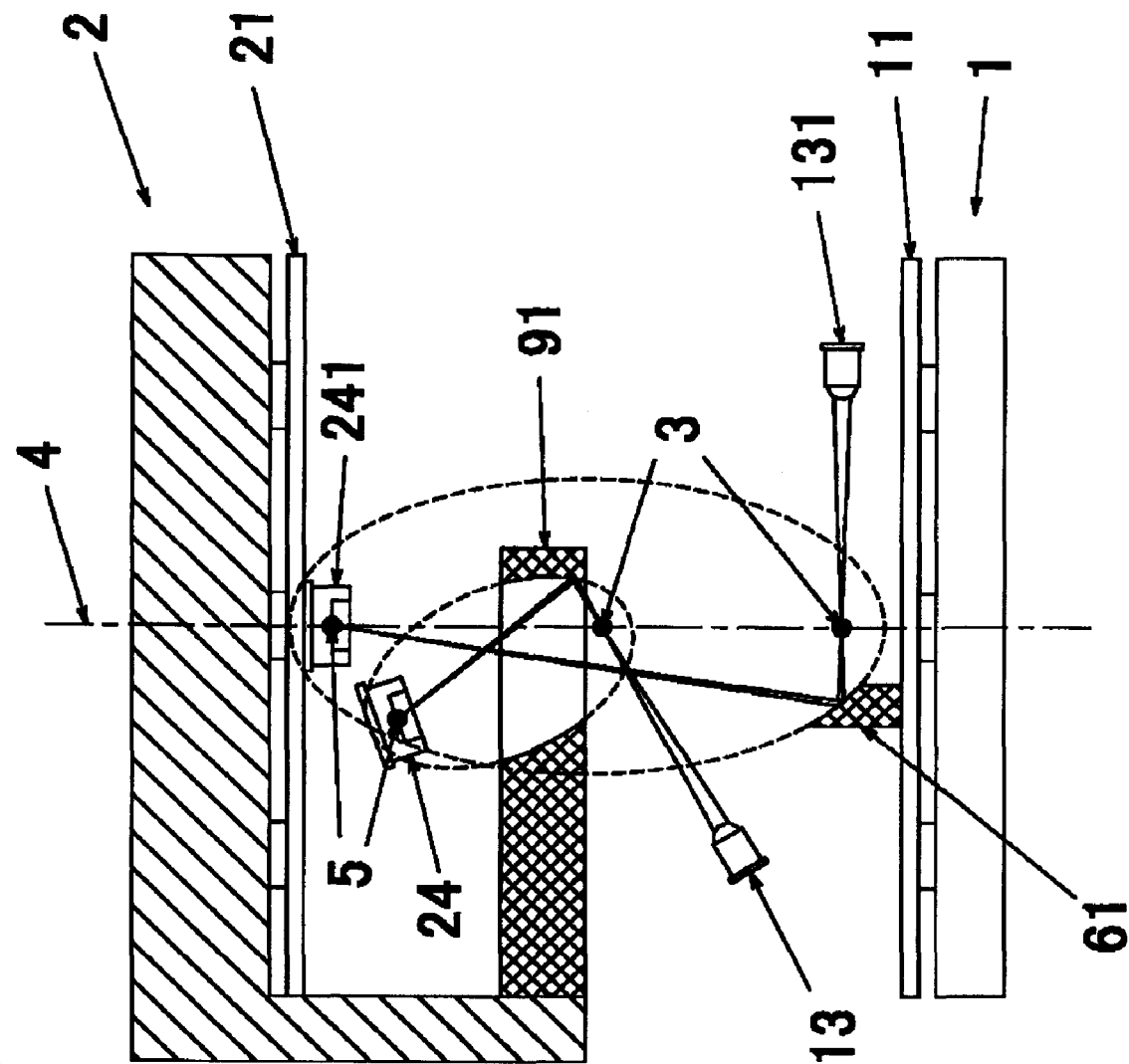
FIG. 9 shows the configuration of a DL 2-Ch system using an ellipse section mirror and an elliptical ring shape mirror.

As an example, FIG. 9 shows an example of a 2-Ch system in which the types of elliptical partial mirrors, which are ellipse section mirrors and elliptical ring shape mirrors, are changed. The requirement of uniformity of incidence characteristics onto light-receiving elements among Chs is relaxed, and so there is greater freedom in configuring optical paths.

Finally, circular ring mirrors are discussed. Circular ring shape mirrors have characteristics similar to those of ellipse section mirrors used for component optical paths B, in that the light-receiving element need to be set on the rotation axis (4).

However, manufacturability is poor compared with ellipse section mirrors, and moreover there is a tendency for angles of incidence onto light-receiving elements to be shallow, so that such mirrors are not frequently used. Hence rather than configuring Multi-Ch systems using component optical paths D employing circular ring mirrors, it is advantageous to configure Multi-Ch systems using component optical paths B employing ellipse section mirrors. Hence here a specific configuration example is not presented.

Further, in response to requests for miniaturization of non-contact connectors (10), specifications for miniaturized ellipse section mirrors for use in each Chs have become more rigorous, and there are cases in which relaxation of the specification of 100% reception of the incident light beam, relaxation of the specifications of partial mirrors which are the same types of elliptical partial mirrors and which are from the same ellipsoid for each Ch, have become necessary.

Figure 10:
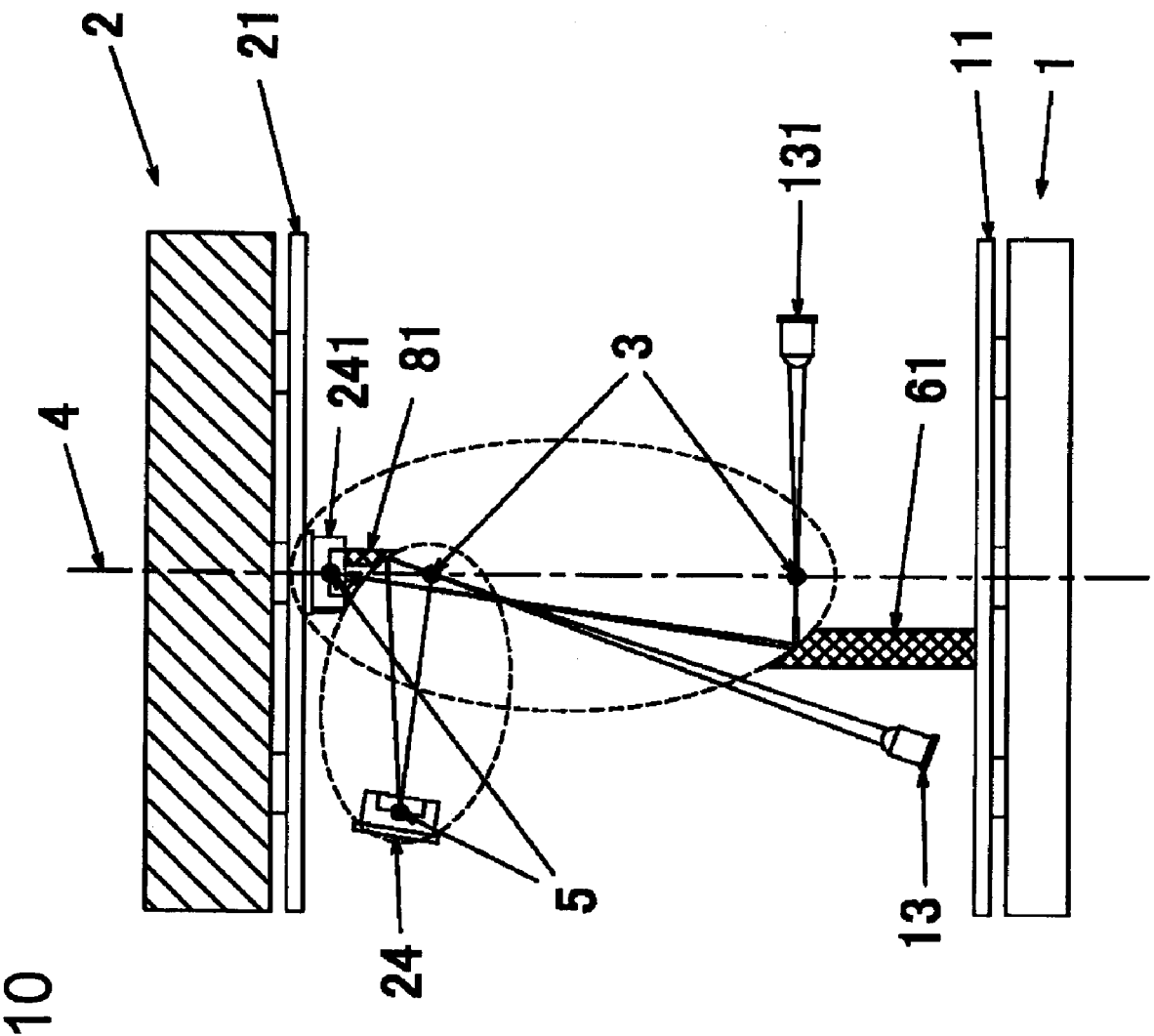
FIG. 10 shows the configuration of a 2-Ch system using ellipse section mirrors of different sizes.

As an example, FIG. 10 shows a configuration example in which one of the ellipse section mirrors in the case of FIG. 7 is miniaturized.

In this configuration example, the non-contact connector (10) can no longer be said to have analog communication functions in all Chs, and must be said to be a non-contact connector (10) having communication functions for hybrid signals (a mixture of analog signals and digital signals), with a portion of the channels used for digital communications.

In the above, methods of realizing Multi-Ch designs for non-contact connectors (10) using elliptical partial mirrors have been described.

The Multi-Ch configuration method entails augmentation of the number of 1-Ch optical paths comprising one light-emitting element→one elliptical partial mirror→one light-receiving element, with each optical path is constructed independently in space (because there are one-to-one relationships, the number of light-emitting elements equals the number of light-receiving elements).

On the other hand, as a Multi-Ch configuration method for a non-contact connector (10), there are also methods employing a plurality of light-emitting elements→one elliptical partial mirror→a plurality of light-receiving elements (there are also cases in which the number of light-emitting elements and the number of light-receiving elements are different). In such cases, assuming modulation and demodulation operations of transmitted optical signals, this may be called an optical Multi-Ch design method in which optical paths are configured such that a plurality of light beams reflected by the elliptical partial mirror are simultaneously received by a plurality of light-receiving elements. (To emphasize the difference, the former may be called a spatial Multi-Ch configuration method.)

Configuring optical paths for a plurality of light beams reflected from a single elliptical partial mirror to a plurality of light-receiving elements means that light-receiving elements are installed at other than the light-receiving side focal point F2 (5) of the elliptical partial mirror.

Optically, this means that optical path beams before or after the light receiving-side focal point F2 (5) are made incident on light-receiving elements.

Figure 11:
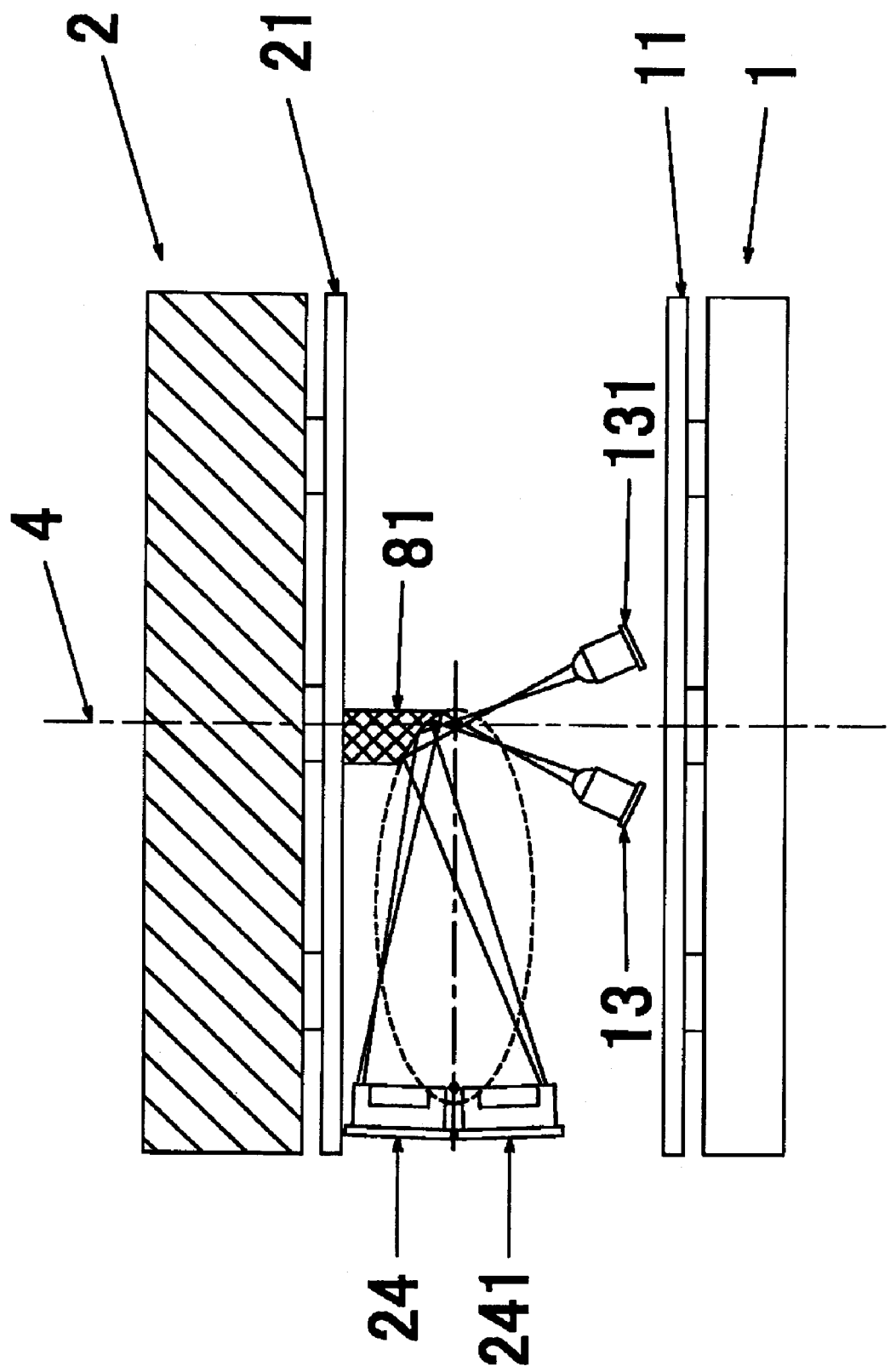
FIG. 11 is a drawing explaining 2-Ch design using one ellipse section mirror.

FIG. 11 shows an example of the configuration of a 2-Ch system by employing an optical Multi-Ch method for the 1-Ch system.

As is seen from FIG. 11, this optical Multi-Ch design method is also based on a 1-Ch optical system, and can be called a Multi-Ch design method in which a light-receiving element with a broad light-receiving range, or else an optical filter, an encoding method for transmitted optical signals, or other Ch identification means are used with a light-receiving element, to multiplex signals in a 1-Ch optical system.

In the above, it was stated that an optical path configuration method in which light beams before or after the light-receiving focal point F2 (5) of an elliptical partial mirror are input to a light-receiving element is a method for Multi-Ch design; but this configuration method can also be applied to optical path configuration for a 1-Ch system.

Figure 12:
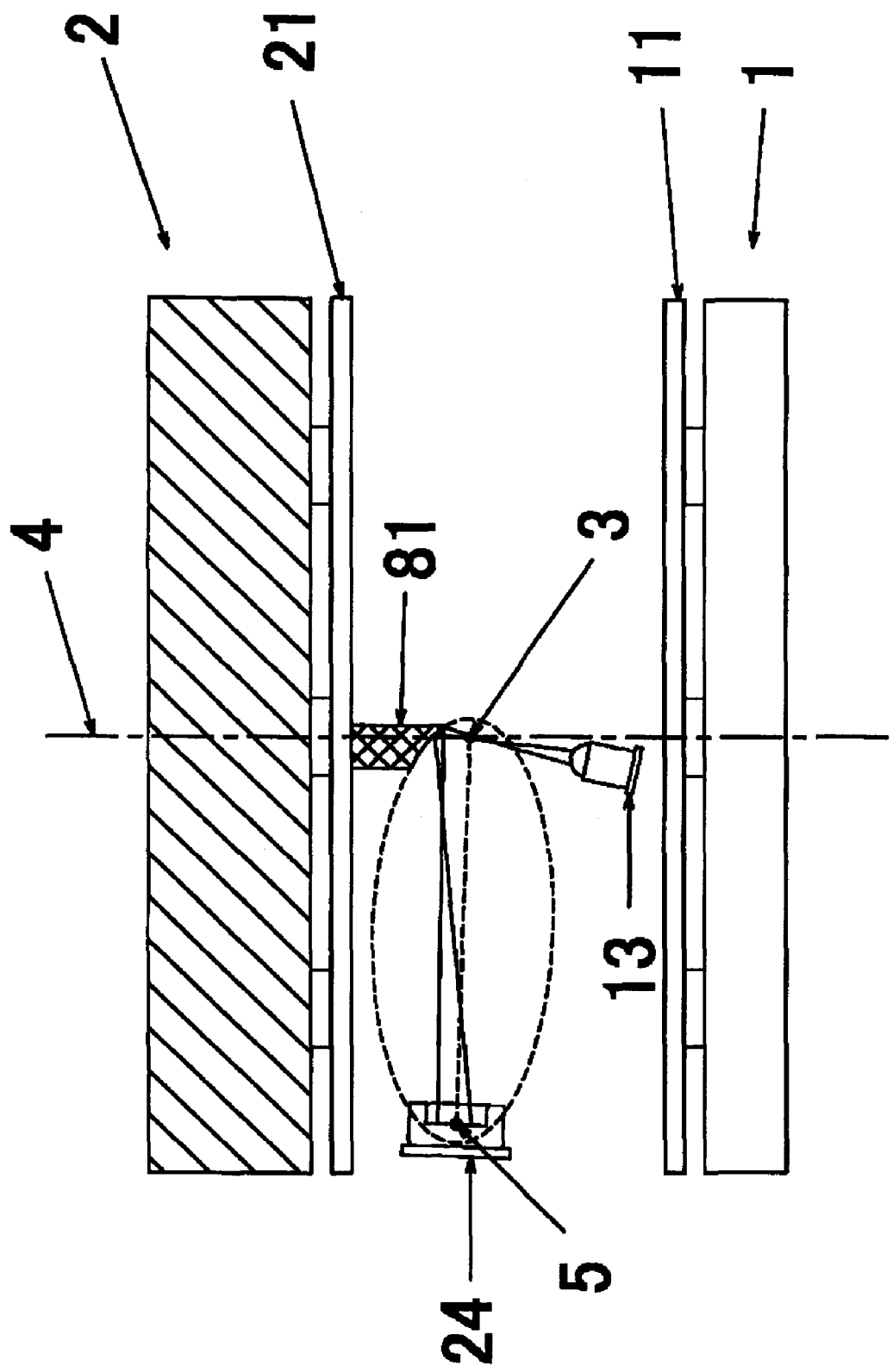
FIG. 12 is a drawing explaining another component optical path for an ellipse section mirror.

FIG. 12 shows an example of an optical path in which, for the 1-Ch system, the "light emission source" position is moved to before the light-emission side focal point F1 (3). The "light emission source" position is at a position other than the light-emission side focal point F1 (3) of the elliptical partial mirror, so that light is no longer condensed at the light receiving-side focal point F2 (5); rather, the beam broadens at the light receiving-side focal point F2 (5). That is, if design is performed such that the "light emission source" position is a position such that the beam diameter can be received by the light-receiving element, then a 1-Ch system optical path can be configured. This optical path configuration method is also useful for relaxing the manufacturing precision of the optical system of the non-contact connector (10).

Methods for configuring Multi-Ch simultaneous bidirectional communication systems have been examined; here, "simultaneity" is considered. "Simultaneity" is "performance enabling simultaneous communication from the rotating side and from the fixed side".

If, as a symmetric structure for a Multi-Ch DL system (or for a Multi-Ch UL system), configuration of a Multi-Ch UL system (or of a Multi-Ch DL system) is performed, then there are no elements blocking optical paths, and so simultaneous bidirectional light emission from light-emitting elements and propagation on optical paths occurs, and bidirectional light is simultaneously received by light-receiving elements. That is, if a DL system and a UL system are combined symmetrically to configure a bidirectional system, "simultaneity" is secured.

Figure 13:
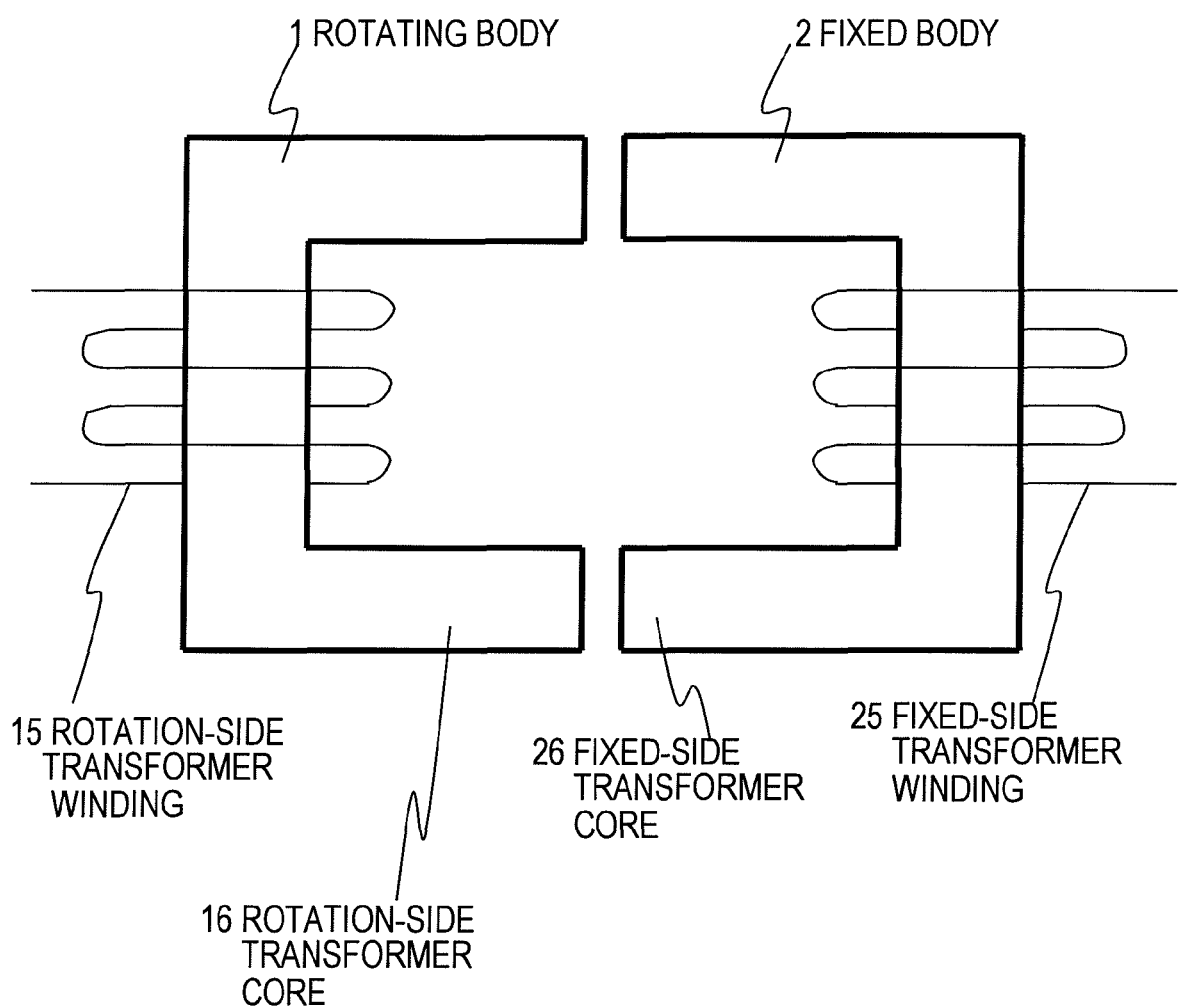
FIG. 13 is a drawing explaining a rotating transformer.

Next, FIG. 13 is used to explain non-contact power supply from a fixed body (2) to a rotating body (1).

As explained above, rotating-side transformer windings (15) are wound around the body portion of the rotating-side transformer core (16) of the rotating body (1), and fixed-side transformer windings (25) are wound around the body portion of the fixed-side transformer core (26) of the fixed body (2). In this state, by passing a power supply current from the device on which this non-contact connector (10) is mounted through the fixed-side transformer windings (25), first a magnetic field occurs in the environs of the fixed-side transformer core (26). Next, because the rotating-side transformer core (16) is positioned opposing the fixed-side transformer core (26) in which the magnetic field has occurred, a magnetic circuit is formed, and a current occurs in the rotating-side transformer windings (15) wound around the body portion (due to the so-called law of electromagnetic induction). By this means, power is supplied to the rotating body (1), and for example a rotating-side electrical circuit portion (11) is driven, so that the rotating-side light-emitting element A (13) can be caused to emit light.

In the above-described examples, explanations were based on an example of formation of a 1-Ch DL system optical path using a rotating-side light-emitting element A (13) fixed-side light-receiving element A (24), and ellipse section mirror (8); however, the rotating-side light-emitting element A (13) and fixed-side light-receiving element A (24) can be replaced with optical fibers, to form an optical path in which there is no interruption between the fixed-side optical fiber and the rotating-side optical fiber.

Of course Multi-Ch simultaneous bidirectional communication between optical fibers is also possible.

The invention claimed is:

1. A non-contact connector, comprising:
   a rotating body;
   a fixed body;
   a rotating-side light-emitting element and a rotating-side light-receiving element installed on the rotating body respectfully; and
   a fixed-side light-emitting element and a fixed-side light-receiving element installed on the fixed body respectfully, wherein
   with a first focal point of a light-emitting side of a three-dimensional elliptical reflecting body being on a side of the rotating body and a second focal point of a light-receiving side being on a side of the fixed body, a condensing action from the first focal point to the second focal point is used to configure an optical path from the rotating-side light-emitting element set at the first focal point, via a fixed-side elliptical partial mirror in which a portion of the three-dimensional elliptical reflecting body is used as a mirror face, to the fixed-side light-receiving element set at the second focal point, and to configure a simultaneous bidirectional single-channel optical path from the fixed-side light-emitting element set at the first focal point of the three-dimensional elliptical reflecting body, via a rotating-side elliptical partial mirror in which a portion of the three-dimensional elliptical reflecting body is used as a mirror face, to the rotating-side light-receiving element set at the second focal point; and
   non-contact multi-channel optical communication is performed simultaneously and bidirectionally by configuring a plurality of single-channel optical paths, simultaneously and bidirectionally, between the rotating body and fixed body.

2. The non-contact connector according to claim 1, wherein a two-channel communication system is configured, by means of
   the optical path of a first channel, in which the focal point of the light-emitting side of a fixed-side ellipse section shape mirror, which is a section shape of the fixed-side elliptical partial mirror, is placed on a rotation axis, and light emitted from the rotating-side light-emitting element installed so as to condense light on the first focal point is reflected by the fixed-side ellipse section shape mirror arrive at the fixed-side light-receiving element installed at the second focal point of the fixed-side ellipse section shape mirror, and
   the optical path of a second channel, in which light emitted from the rotating-side light-emitting element installed so as to condense light on the light-emission side focal point of a rotating-side ellipse section shape mirror, which is a section shape of the rotating-side elliptical partial mirror, is reflected by the rotating-side ellipse section shape mirror installed such that the other light-receiving side focal point coincides with the rotation axis to arrive at a fixed-side light-receiving element at the light-receiving side focal point;
   with the optical paths configured such that substantially 100% of the light emission amounts of light-emitting elements is received by the fixed-side light-receiving element and by the fixed-side light-receiving element respectively, and, by making the fixed-side ellipse section shape mirror and the rotating-side ellipse section shape mirror partial mirrors of the same ellipsoid, whereby differences, in light-receiving characteristics, between the fixed-side light-receiving element and the fixed-side light-receiving element are made negligible.

3. The non-contact connector according to claim 1, wherein for the optical path configuration of one channel in which the first focal point of the light-emission side of a fixed-side elliptical ring mirror which is a ring shape of the fixed-side elliptical partial mirror is placed on the rotation axis, light emitted from the rotating-side light-emitting element installed so as to condense light on the first focal point is reflected by the fixed-side elliptical ring mirror to arrive at the fixed-side light-receiving element installed at the second focal point of the light-receiving side of the fixed-side elliptical ring mirror,
   a communication system of three or more channels, formed by parallel motion and stacking of the optical path configuration along the rotation axis, configures optical paths such that substantially 100% of the light emission amounts of light-emitting elements is received, and the fixed-side elliptical partial mirrors for three or more channels are partial mirrors of the same ellipsoid, whereby differences in light-receiving characteristics between light-receiving elements are made negligible.

4. The non-contact connector according to claim 1, wherein, with the optical path from the rotating-side light-emitting element via the fixed-side elliptical partial mirror to the fixed-side light-receiving element being configured with plane symmetry with respect to a prescribed point on the rotation axis, as the optical path from the fixed-side light-emitting element via the rotating-side elliptical partial mirror to the rotating-side light-receiving element a configuration method of configuring a simultaneous bidirectional single-channel communication system is applied to configuration for a plurality of optical paths, thereby configuring a simultaneous bidirectional multi-channel communication system.

5. The non-contact connector according to claim 1, wherein for the fixed-side elliptical partial mirror and the rotating-side elliptical partial mirror, the shapes of the fixed-side ellipse section shape mirror and the rotating-side ellipse section shape mirror are not formed as partial section shape mirrors of the same ellipsoid, and the two-channel communication system according to claim 2 is configured, or, for a communication system of three or more channels, the fixed-side elliptical partial mirrors are not formed as partial mirrors of the same ellipsoid, and a multi-channel communication system of three or more channels according to claim 3 is configured; and a multi-channel communication system is configured by means of any combination of the fixed-side ellipse section shape mirror and the fixed-side ellipse section shape mirror forming the fixed-side elliptical partial mirrors, the fixed-side elliptical ring mirror; the rotating-side ellipse section shape mirror and the rotating-side ellipse section shape mirror forming the rotating-side elliptical partial mirror, and the rotating-side elliptical ring mirror.

6. The non-contact connector according to claim 1, wherein a single-channel communication system is configured with the fixed-side elliptical partial mirror as the fixed-side ellipse section shape mirror or fixed-side ellipse section shape mirror or the fixed-side elliptical ring mirror, or a simultaneous bidirectional single-channel communication system is configured with the rotating-side elliptical partial mirror as the rotating-side ellipse section shape mirror or the rotating-side ellipse section shape mirror or rotating-side elliptical ring mirror.

7. The non-contact connector according to claim 1, further comprising a transformer core and transformer winding in each of the rotating body and the fixed body, wherein a rotating transformer is formed by the rotating body and the fixed body.

8. The non-contact connector according to claim 1, wherein the light-emitting members and the light-receiving members represented by the rotating-side optical elements and the rotating-side optical elements, and the fixed-side optical elements and the fixed-side optical elements are configured using optical fibers with collimators, and that optical paths are formed between the optical fibers.

* * * * *